United States Patent
Hammond, II et al.

(10) Patent No.: US 8,239,917 B2
(45) Date of Patent: Aug. 7, 2012

(54) SYSTEMS AND METHODS FOR ENTERPRISE SECURITY WITH COLLABORATIVE PEER TO PEER ARCHITECTURE

(75) Inventors: Frank J. Hammond, II, Palmer Lake, CO (US); Frank J. Ricotta, Jr., Colorado Springs, CO (US); Hans Michael Dykstra, Monument, CO (US); Blake Andrew Williams, Colorado Springs, CO (US); Steven James Carlander, Monument, CO (US); Sarah Williams Gerber, Colorado Springs, CO (US)

(73) Assignee: Enterprise Information Management, Inc., Colorado Springs, CO (US)

( * ) Notice: Subject to any disclaimer, the term of this patent is extended or adjusted under 35 U.S.C. 154(b) by 1225 days.

(21) Appl. No.: 11/928,256

(22) Filed: Oct. 30, 2007

(65) Prior Publication Data

US 2008/0307488 A1  Dec. 11, 2008

Related U.S. Application Data

(63) Continuation-in-part of application No. 10/758,852, filed on Jan. 16, 2004, now abandoned, and a continuation-in-part of application No. 10/687,320, filed on Oct. 16, 2003, now Pat. No. 7,840,806.

(60) Provisional application No. 60/440,522, filed on Jan. 16, 2003, provisional application No. 60/440,656, filed on Jan. 16, 2003, provisional application No. 60/440,503, filed on Jan. 16, 2003, provisional application No. 60/418,889, filed on Oct. 16, 2002.

(51) Int. Cl.
*G06F 17/00* (2006.01)
*G06F 7/02* (2006.01)
*G06F 15/16* (2006.01)
*H04L 29/06* (2006.01)

(52) U.S. Cl. ............ 726/1; 726/4; 726/26; 726/29

(58) Field of Classification Search ............ None
See application file for complete search history.

(56) References Cited

U.S. PATENT DOCUMENTS 4,748,668 A  5/1988  Shamir et al.
(Continued)

OTHER PUBLICATIONS

Office Action dated Dec. 24, 2009 issued in related U.S. Appl. No. 10/687,320, 11 pages.

(Continued)

*Primary Examiner* — Matthew Henning
(74) *Attorney, Agent, or Firm* — Lathrop & Gage LLP

(57) ABSTRACT

Systems and methods authenticate a device to operate within an enterprise system with an enterprise policy. An agent, installed on the device, analyzes the device to determine profile information of the device. The determined profile information is sent to a type 2 super peer that verifies whether the profile information conforms to the enterprise policy. If the profile information conforms to the enterprise policy, an agent trust credential is generated, within the type 2 super peer, for the agent, based upon the profile information, and issued to the agent. Authenticity of the device is verified based upon the agent trust credential. If the device is authenticated, communications with the device are permitted. If the device is not authenticated, communications with the device is prevented. In another embodiment, a method restores a device to conform to a system policy. A snapshot of critical components of the device is taken while the device is in compliance with the system policy. The critical components are monitored to identify critical components that differ from the critical components of the snapshot. If differing critical components are detected, the device is restored to conform with system policy by replacing differing critical components based upon the snapshot.

11 Claims, 13 Drawing Sheets

U.S. PATENT DOCUMENTS

| | | | |
|---|---|---|---|
| 4,926,479 | A | 5/1990 | Goldwasser et al. |
| 4,956,863 | A | 9/1990 | Goss |
| 4,969,189 | A | 11/1990 | Ohta et al. |
| 5,136,642 | A | 8/1992 | Kawamura et al. |
| 5,140,634 | A | 8/1992 | Guillou et al. |
| 5,146,500 | A | 9/1992 | Maurer |
| 5,154,841 | A | 10/1992 | Tucker et al. |
| 5,245,657 | A | 9/1993 | Sakurai |
| 5,581,615 | A | 12/1996 | Stern |
| 5,600,725 | A | 2/1997 | Rueppel et al. |
| 5,606,617 | A | 2/1997 | Brands |
| 5,666,419 | A | 9/1997 | Yamamoto et al. |
| 5,987,138 | A | 11/1999 | Gilbert et al. |
| 6,011,848 | A | 1/2000 | Kanda et al. |
| 6,044,463 | A | 3/2000 | Kanda et al. |
| 6,069,647 | A | 5/2000 | Sullivan et al. |
| 6,076,167 | A * | 6/2000 | Borza ........................ 726/5 |
| 6,079,163 | A | 6/2000 | Daoud |
| 6,122,742 | A | 9/2000 | Young et al. |
| 6,141,778 | A * | 10/2000 | Kane et al. ..................... 726/4 |
| 6,154,841 | A | 11/2000 | Oishi |
| 6,189,098 | B1 | 2/2001 | Kaliski, Jr. |
| 6,263,446 | B1 | 7/2001 | Kausik et al. |
| 6,282,295 | B1 | 8/2001 | Young et al. |
| 6,298,441 | B1 | 10/2001 | Handelman et al. |
| 6,327,659 | B2 | 12/2001 | Boroditsky et al. |
| 6,389,136 | B1 | 5/2002 | Young et al. |
| 6,389,536 | B1 | 5/2002 | Nakatsuyama |
| 6,411,715 | B1 | 6/2002 | Liskov et al. |
| 6,567,916 | B1 | 5/2003 | Terao et al. |
| 6,651,167 | B1 | 11/2003 | Terao et al. |
| 6,889,322 | B1 | 5/2005 | Levy |
| 6,937,728 | B1 | 8/2005 | Abe et al. |
| 6,950,948 | B2 | 9/2005 | Neff |
| 6,952,476 | B1 | 10/2005 | Mao |
| 6,978,372 | B1 | 12/2005 | Jakobsson |
| 7,003,514 | B2 | 2/2006 | Dutta et al. |
| 7,003,541 | B2 | 2/2006 | Furukawa et al. |
| 7,007,301 | B2 | 2/2006 | Crosbie et al. |
| 7,028,338 | B1 | 4/2006 | Norris et al. |
| 7,031,470 | B1 | 4/2006 | Bar-On |
| 7,047,408 | B1 | 5/2006 | Boyko et al. |
| 7,058,808 | B1 | 6/2006 | Zolotorev et al. |
| 7,058,968 | B2 | 6/2006 | Rowland et al. |
| 7,062,490 | B2 | 6/2006 | Adya et al. |
| 7,085,936 | B1 | 8/2006 | Moran |
| 7,089,323 | B2 | 8/2006 | Theimer et al. |
| 7,096,499 | B2 | 8/2006 | Munson |
| 7,165,181 | B2 | 1/2007 | Brickell |
| 7,178,166 | B1 * | 2/2007 | Taylor et al. .................... 726/25 |
| 7,181,768 | B1 | 2/2007 | Ghosh et al. |
| 7,184,547 | B1 | 2/2007 | Girault et al. |
| 7,219,239 | B1 | 5/2007 | Njemanze et al. |
| 7,222,362 | B1 | 5/2007 | Canetti et al. |
| 7,260,716 | B1 | 8/2007 | Srivastava |
| 7,305,705 | B2 | 12/2007 | Shelest et al. |
| 7,308,097 | B2 | 12/2007 | Hoffstein et al. |
| 7,313,701 | B2 | 12/2007 | Frankel et al. |
| 7,370,358 | B2 | 5/2008 | Ghanea-Hercock |
| 7,373,499 | B2 | 5/2008 | MacKenzie et al. |
| 7,415,614 | B2 | 8/2008 | Guillou |
| 7,543,139 | B2 | 6/2009 | Camenisch et al. |
| 7,747,857 | B2 | 6/2010 | Ramzan et al. |
| 2001/0034837 | A1 | 10/2001 | Kausik et al. |
| 2001/0042049 | A1 | 11/2001 | Zucker et al. |
| 2001/0044895 | A1 | 11/2001 | Hada |
| 2002/0007457 | A1 | 1/2002 | Neff |
| 2002/0136401 | A1 | 9/2002 | Hoffstein et al. |
| 2002/0188505 | A1 | 12/2002 | Burrus, IV |
| 2002/0188605 | A1 | 12/2002 | Adya et al. |
| 2003/0065692 | A1 | 4/2003 | Furukawa et al. |
| 2003/0115464 | A1 | 6/2003 | Nyang et al. |
| 2003/0120929 | A1 | 6/2003 | Hoffstein et al. |
| 2003/0158960 | A1 | 8/2003 | Engberg |
| 2003/0172284 | A1 | 9/2003 | Kittler |
| 2003/0177352 | A1 | 9/2003 | Camenisch et al. |
| 2003/0182559 | A1 | 9/2003 | Curry et al. |
| 2003/0195995 | A1 * | 10/2003 | Tabbara ........................ 709/313 |
| 2003/0196106 | A1 | 10/2003 | Erfani et al. |
| 2004/0006650 | A1 | 1/2004 | Theimer et al. |
| 2004/0008845 | A1 | 1/2004 | Le et al. |
| 2004/0015719 | A1 | 1/2004 | Lee et al. |
| 2004/0028221 | A1 | 2/2004 | Seysen |
| 2004/0054885 | A1 | 3/2004 | Bartram et al. |
| 2004/0103281 | A1 | 5/2004 | Brickell |
| 2004/0123141 | A1 | 6/2004 | Yadav |
| 2004/0133781 | A1 | 7/2004 | Guillou |
| 2004/0177252 | A1 | 9/2004 | Vallee et al. |
| 2005/0069135 | A1 | 3/2005 | Brickell |
| 2005/0086492 | A1 * | 4/2005 | Nicodemus et al. .......... 713/182 |
| 2005/0130723 | A1 * | 6/2005 | Grivas et al. ............... 455/575.9 |
| 2005/0265550 | A1 | 12/2005 | Tuyls et al. |
| 2006/0200856 | A1 * | 9/2006 | Salowey et al. ................... 726/5 |
| 2007/0113077 | A1 | 5/2007 | Brickell |
| 2008/0098478 | A1 * | 4/2008 | Vaidya et al. ................... 726/24 |

OTHER PUBLICATIONS

Response to Office Action filed on Mar. 22, 2010 in related U.S. Appl. No. 10/687,320, 17 pages.

Notice of Allowance issued on Jul. 8, 2010 in related U.S. Appl. No. 10/687,320, 8 pages.

Menezes et al., Handbook of Applied Cryptography, 1996, CRC Press, chapter 10, pp. 385-424.

Response to Office Action of Mar. 26, 2007, Related U.S. Appl. No. 10/687,320, filed Sep. 26, 2007.

Office Action, Related U.S. Appl. No. 10/687,320, Mar. 26, 2007.

Response to Office Action, of Jun. 4, 2007, Related U.S. Appl. No. 10/758,852, filed Oct. 27, 2007.

Office Action, Related U.S. Appl. No. 10/758,852, Jun. 4, 2007.

U.S. Appl. No. 10/758,852 Office Action dated Jan. 9, 2008, 20 pages.

U.S. Appl. No. 10/758,852 Response to Office Action dated Jun. 9, 2008, 27 pages.

U.S. Appl. No. 10/758,852 Office Action dated Sep. 9, 2008, 26 pages.

U.S. Appl. No. 10/758,852 Response to Office Action dated Feb. 10, 2009, 31 pages.

U.S. Appl. No. 10/758,852 Office Action dated Apr. 28, 2009, 16 pages.

U.S. Appl. No. 10/687,320 Notice of Non-Compliant Amendment dated Dec. 11, 2007, 2 pages.

U.S. Appl. No. 10/687,320 Response to Office Action dated Jan. 11, 2008, 12 pages.

U.S. Appl. No. 10/687,320 Notice of Non-Compliant Amendment dated Jul. 9, 2008, 4 pages.

U.S. Appl. No. 10/687,320 Response to Office Action dated Jul. 25, 2008, 7 pages.

U.S. Appl. No. 10/687,320 Office Action dated Oct. 8, 2008, 13 pages.

U.S. Appl. No. 10/687,320 Response to Office Action dated Feb. 10, 2009, 12 pages.

U.S. Appl. No. 10/687,320 Office Action dated May 20, 2009, 15 pages.

U.S. Appl. No. 10/687,320 Response to Office Action dated Sep. 21, 2009, 20 pages.

* cited by examiner

FIG. 20

FIG. 21

SYSTEMS AND METHODS FOR ENTERPRISE SECURITY WITH COLLABORATIVE PEER TO PEER ARCHITECTURE

RELATED APPLICATIONS

This application is a continuation-in-part of U.S. Ser. No. 10/758,852, filed Jan. 16, 2004 now abandoned, which claims priority to U.S. Provisional Ser. Nos. 60/440,522, filed Jan. 16, 2003; 60/440,656, filed on Jan. 16, 2003, and 60/440,503, filed Jan. 16, 2003. This application is also a continuation-in-part of U.S. Ser. No. 10/687,320, filed Oct. 16, 2003 now U.S. Pat. No. 7,840,806, which claims priority to U.S. Provisional Ser. No. 60/418,889, filed Oct. 16, 2002. Each of the above-referenced patent applications is incorporated herein by reference.

BACKGROUND

A computer system may contain many components (e.g., individual computers) that are interconnected by an internal network. The computer system may be subject to attack from internal and external sources. For example, the computer system may be attacked when portable media (e.g., a USB drive) is used with one or more components of the computer system. In another example, the computer system may be attacked when a connection is made (by one or more components) to an external communication device, such as when an individual computer of the computer system uses a modem to connect to an information service provider (ISP). In another example, if the computer system has a permanent connection to the Internet it is vulnerable to attack from that connection. In another example, the computer system may be attacked through a permanent connection to an internal network (LAN) connected to the Internet. Such attacks may be intended to cripple the targeted computer system either temporarily or permanently, or may instead settle to acquire confidential information, or both. One type of attack may be in the form of a virus: a parasite that travels though network connections (particularly the Internet) and attempts to discover and map encountered computer systems. The parasite may not initially be destructive; in such event it remains undetected since current passive virus detection systems only detect destructive attacks. The parasite may therefore gather critical system information that is sent back to the attacking organization, often as data blended with a normal data stream.

Over time, the parasite's actions allow the attacking organization to build a map of targeted computer systems. Once the map has sufficient information, the attacking organization may launch a more destructive parasite that attacks one or more specific target computer systems at specified times, producing chaos and havoc in the targeted computer systems by generating bad data and possibly shutting down the targeted computer systems.

In another form of attack, an attacker may attempt to gain unauthorized access to a computer system. For example, an attacker may repeatedly attempt to gain access to an individual computer of the computer system by iteratively attempting account and password combinations. In another type of attack, an authorized person may maliciously attempt to corrupt the computer system.

Current protection software only recognizes known parasites, and is therefore ineffective against a new parasite attack until that new parasite is known to the current protection software. Current protection software also operates to detect an attack by monitoring the system for damage; this detection thus occurs after damage is inflicted. Although current protection software may detect certain malicious parasites, computer systems are still vulnerable to mapping parasite attack and other types of attack.

A computer system that includes a wireless network may be considered more vulnerable to attack because of the wireless nature of the wireless network. Often, a wireless network extends beyond its required operational area, and thus an attacker may have more opportunity to attack the wireless network. Thus, the wireless network is often configured with a key known only by devices authorized to use the wireless network. Where a computer system includes wireless networking (WiFi), set-up and deployment of wireless devices (e.g., WiFi enabled computers and PDA's) is often an arduous and time consuming (i.e., expensive) task. Typically, each wireless device requiring access to the wireless network must be loaded with the wireless network key and/or knowledge of the wireless network's WiFi NIC MAC address. Such information is manually entered into the wireless access point system, and then replicated to all access points within the wireless network to provide full and secure roaming coverage for the wireless devices within wireless network area (i.e., within range of the wireless network).

A computer network system contains many components (e.g., individual computers) that are interconnected by an internal network. The computer system may be subject to attack from internal and external sources. For example, viral infections, or more insidious information theft attacks from spyware or Bots.

Such attacks may be intended to cripple the targeted computer system either temporarily or permanently, or may instead settle to acquire confidential information, or both. One type of attack may be in the form of a virus: a Bot that travels though network connections (particularly the Internet) and attempts to discover and map encountered computer systems. The Bot may not be destructive; in such event it remains undetected since current passive virus detection systems only detect know signatures and IDS systems only detect signatures of possibly destructive attacks. The Bot may therefore gather critical system information that is sent back to the attacking organization, often as data blended with a normal data stream.

SUMMARY OF THE INVENTION

In one embodiment, a method authenticates a device to operate within an enterprise system with an enterprise policy. An agent, installed on the device, analyzes the device to determine profile information of the device. The determined profile information is sent to a type 2 super peer that verifies whether the profile information conforms to the enterprise policy. If the profile information conforms to the enterprise policy, an agent trust credential is generated, within the type 2 super peer, for the agent, based upon the profile information, and issued to the agent. Authenticity of the device is verified based upon the agent trust credential. If the device is authenticated, communications with the device are permitted. If the device is not authenticated, communications with the device is prevented.

In another embodiment, a realm controller with high reliability and high availability, includes: a first computer system, a second computer system in communication with the first computer system, and a SSI clustering package running on each of the first and second computer systems. Realm controller operation continues without interruption if a hardware failure occurs on any one of the first and second computers.

In another embodiment, a method isolates a device from communicating with a network when the device profile deviates from a defined system policy. An active agent is installed on the device, and the active agent is operated to periodically profile the device and to determine whether the device profile conforms to the system policy. If the profile does not comply, the device is prevented from communicating with the network using the active agent. The active agent allows the device to communicate with the network if the profile does comply.

In another embodiment, a method restores a device to conform to a system policy. A snapshot of critical components of the device is taken while the device is in compliance with the system policy. The critical components are monitored to identify critical components that differ from the critical components of the snapshot. If differing critical components are detected, the device is restored to conform with system policy by replacing differing critical components based upon the snapshot.

BRIEF DESCRIPTION OF THE FIGURES

FIG. 20 shows one exemplary hit window illustrating usage of a port.

FIG. 21 shows one exemplary rule definition window illustrating fields that define each rule.

DETAILED DESCRIPTION OF THE FIGURES

Root Trust

Figure 1:
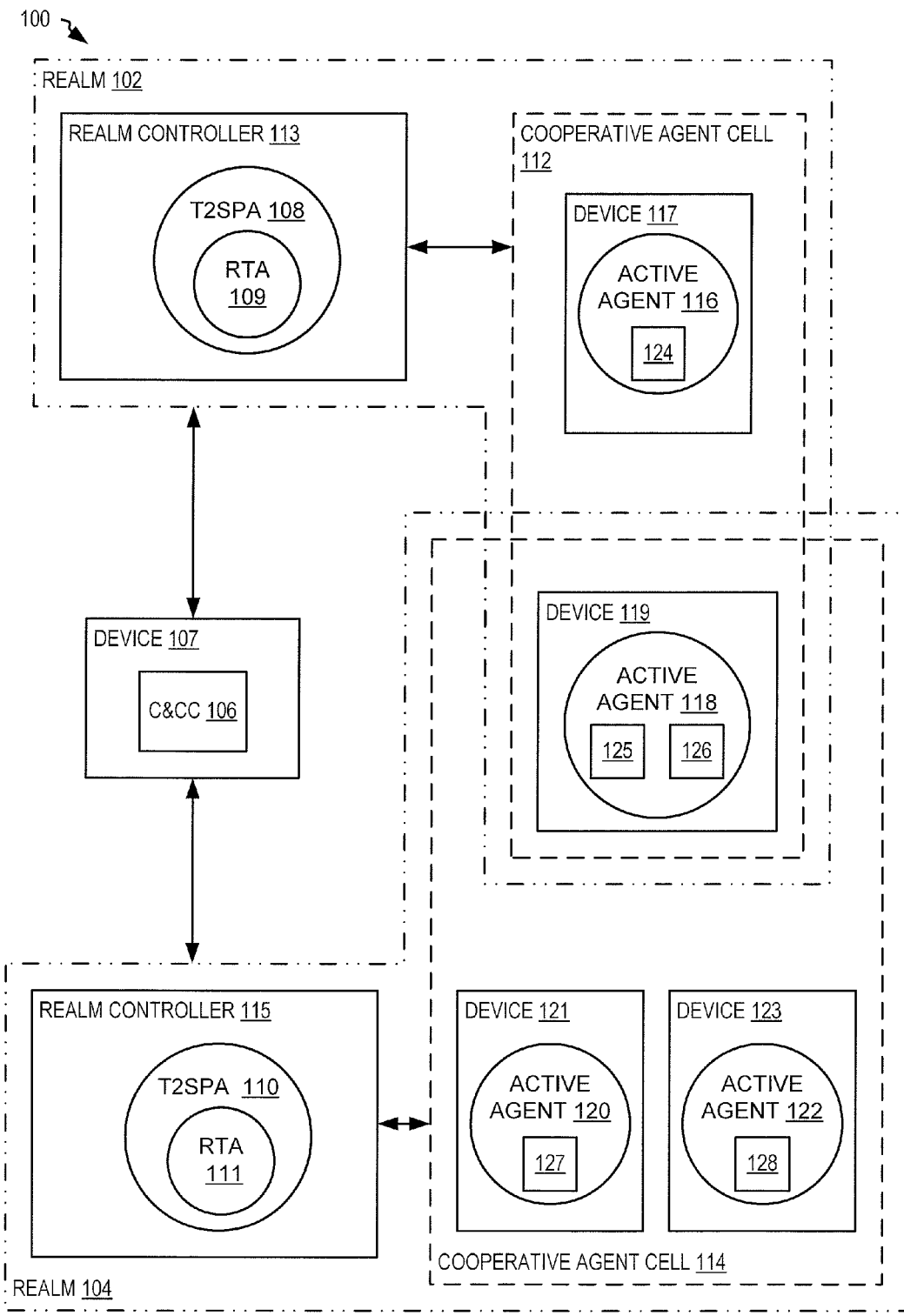
FIG. 1 shows one exemplary enterprise system embodiment with four devices, two realm controllers and one Command & Control Center (C&CC).

In ordinary human interactions, high levels of trust may be gained piecemeal, through multiple successful interactions. Conversely, unsuccessful interactions typically lead to loss of trust. To permit simple interactions or transactions to take place, however, it is necessary for a basic level of trust to be established quickly. For example, in business interactions, people who have been introduced through proper channels are assumed sufficiently trustworthy within defined roles and parameters. A computing environment also requires that trust be allocated. For example, to introduce a new piece of software or hardware into a network environment, a basic level of trust is required in order for the software to be permitted to perform its function; it is unacceptable for the software to start from a basis of zero trust. As in business interactions, within a computer system, an initial level of trust, known as the root trust, must be granted through a source that is trusted to fulfill the role of allocating trust within the computing system. This trusted source is known as the root trust authority that grants root trust in the form of a trust credential. This trust credential may be used as proof of trust.

The root trust authority is the most vulnerable point in a computer system since integrity and security of the computer system relies on the fact that the root trust authority remains secure. If the root trust authority is compromised and grants trust to non-trustworthy devices, the entire computer system may be rendered vulnerable to attack. Thus, best measures must be put into place for protecting the root trust authority. For example, the root trust authority may be hosted on a device that is secured from physical attack (i.e., located in a secure room).

Security may be further improved by requiring human intervention to authorize the root trust authority to issue a root trust credential to another device. Alternatively, the root trust authority may issue a basic trust credential to another device without human intervention, based only on the fact that the device requesting the trust credential is interacting in ways that are proper and consistent with the trust credential requested. Human intervention might then be required to increase the degree of trust assigned to a device or provide additional trust roles.

Public Key Infrastructure (PKI)

If a first party wishes to receive secure information from a second party, the first party generates a private key and a public key. The private and public keys are created as a matched pair using an algorithm. The private key is known only to the first party and the public key is made publicly available (as part of a digital certificate) in a directory or repository that may be accessed by interested parties. The private key is never shared with anyone or sent across the Internet, for example. The private key is used to decrypt information that has been encrypted using the public key. The first party may, for example, send the public key to the second party, or the second party may retrieve the first party's public key from the public directory, for example. The second party then utilizes the first party's public key to encrypt information into a coded message. The coded message may then be sent securely over any communication channel since it may only be decrypted using the first party's private key. Specifically, the coded message cannot be decrypted using the public key used to encrypt it. When the coded message is received by the first party, the first party decodes the information using the private key. Since the coded message may only be unencrypted using the private key, known only to the first party, the information may be securely transferred across insecure media.

The second party may also request a private key and a public key from the CA. These keys will be different from the keys of the first party. In addition to encrypting messages to ensure privacy, the second party may authenticate itself to the first party, for example, to prove the identity of the sender of the coded message. The second party would encrypt a digital certificate using its private key such that when the message is received by the first party, the first party may decrypt the digital certificate using the public key (obtained from the directory, for example) of the second party.

In summary, information encrypted using a public key may only be decrypted using the matching private key. Similarly, information encrypted using the private key may only be decrypted using the matching public key.

Digital Signature

A digital signature may be used to verify authenticity of an electronic document. Digital signatures also use private and public keys (which may be the same as the keys used for encryption) to verify that a message has not been altered. For example, a message created by the first party may be digitally signed by the first party such that anybody reading the message is sure that the message is an authentic message from the first party and has not been modified. Once the message has been created, the first party uses a hashing algorithm to generate an original hash value based upon the message, and then encrypts the original hash value using their private key. Any receiver of the message may decrypt the digital signature to obtain the original hash value using the first party's public key and then, using the same hashing algorithm, calculate a new hash value for the message for comparison to the original hash value. If the new hash value is the same as the original hash value (obtained from the digital signature) then the message has not been altered (since any change to the message would cause the hashing algorithm to generate a different hash value). The digital signature therefore provides a method of verifying that the message content has not been modified, even if the message is not encrypted. However, since any party may generate public and private keys, a digital signature does not ensure that the message is really from the party that claims to be the sender. For example, if a third party generates a public and private key pair, and publishes or sends the public key to the second party using the name of the first party, the second party does not know if the first party has created a new key pair, or if there is an imposter. The digital signature is therefore not sufficient for providing a party's identity of for establishing trust.

Digital Certificates

A digital certificate provides evidence of credentials when doing business or other transactions over an electronic communication pathway, such as the Internet. A digital certificate is issued by a certification authority (CA) and may, for example, contain an identifier (e.g., a name), a serial number, expiration dates, a copy of the certificate holder's public key (used for encrypting messages and digital signatures), and a digital signature from the certificate-issuing authority to enable a recipient to verify that the certificate is real and has not been modified. The digital certificate may conform to a standard, X.509, for example. Digital certificates may be kept in registries that allow users to look up a public key of an entity with whom they wish to communicate securely, for example. Since the digital certificate is digitally signed by a trusted authority (i.e., the CA), its contents is known to be as trustworthy as the trusted authority.

A digital certificate may also have extensions that may be utilized to store specific information related to the use of the digital certificate. For example, by including device profile information as an extension to a digital certificate, the digital certificate may be used for authentication and trust between agents.

FIG. 1 shows one exemplary enterprise system 100 with four devices 117, 119, 121 and 123, two realm controllers 113 and 115 and one C&CC 106. Enterprise system 100 has two realms 102 and 104. Realm 102 includes realm controller 113, device 117 and device 119. Realm 104 includes realm controller 115, device 119, device 121 and device 123. Realm controller 113 includes a Type 2 Super Peer (T2SPA) 108 and a root trust authority 109; realm controller 115 includes a T2SPA 110 and a root trust authority 111. Within realm 102, realm controller 113 operates as a CA and within realm 104, realm controller 115 operates as a CA. In particular, T2SPA 108 and root trust authority 109 operates as a CA within realm 102 and T2SPA 110 and root trust authority 111 operate as a CA within realm 104. Realm controllers 113 and 115 form the basis of trust within realms 102 and 104, respectively. Realm controllers 113 and 115 may, for example, be installed within secure locations to increase security and trust of realms 102 and 104.

An active agent 116 is installed on device 117, an active agent 118 is installed on device 119, an active agent 120 is installed on device 121 and an active agent 122 is installed on device 123. Active agents 116 and 118 cooperate to form a cooperative agent cell 112 within realm 102 and active agents 118, 120 and 122 cooperate to form a cooperative agent cell 114 within realm 104. Note that device 119 is included within realm 102 and realm 104 and that active agent 118 is included in both cooperative agent cell 112 and cooperative agent cell 114.

C&CC 106 interacts with T2SPAs 108, 110 and cooperative agent cells 112, 114 to provide a plurality of status and control views to an administrator (i.e., a user of C&CC 106). Through C&CC 106, the administrator may view real-time, easy to understand, displays of security status information relating to enterprise system 100 and respond to security alerts. The administrator, through C&CC 106, may also manage enterprise security and configuration policies and see detailed reports of security events. C&CC 106 also provides support for historical forensic activity analysis of these security events. C&CC 106 also provides real-time response and remediation across all agents (e.g., agents 116, 118, 120 and 122) within enterprise system 100.

Active agent 116 is illustratively shown with an agent trust credential 124; active agent 119 is illustratively shown with agent trust credentials 125 and 126; active agent 120 is illustratively shown with an agent trust credential 127; and active agent 122 is illustratively shown with an agent trust credential 128. Agent trust credentials 124, 125, 126, 127 and 128 may, for example, represent a agent trust credential 300, shown in FIG. 3 and described below. Agent trust credentials 124 and 125 allow active agents 116 and 118, respectively, to operate within realm 102. Similarly, agent trust credentials 126, 127 and 128 allow active agents 118, 120 and 122, respectively, to operate within realm 104. In particular, for active agent 118, agent trust credential 125 is utilized for communication within realm 102 and agent trust credential 126 is used for communication within realm 104.

Increasing Security of Devices with Biometric Scanners

Figure 2:
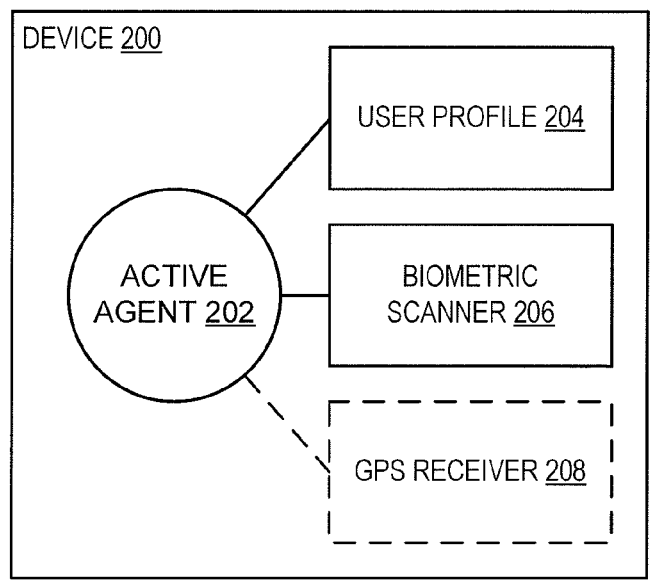
FIG. 2 shows one exemplary device with an active agent, user login information and a biometric scanner.

FIG. 2 shows one exemplary device 200 that has an active agent 202, user login information 204 and a biometric scanner

206. Device 200 is, for example a computer system (e.g., a desktop computer, a notebook computer, a personal digital assistant or a cell phone—any device that includes a processor) for use by one or more users. Biometric scanner 206 may represent one of: a fingerprint scanner, an iris scanner, a voice recognition system, etc. User login information 204 may include one or more of a user name and password, fingerprint matching information, iris matching information, voice matching information etc. User login information 204 thus contains information for identification of permitted users of device 200 using biometric scanner 206.

In one example of operation, active agent 202 utilizes biometric scanner 206 to identify, at least once, a user of device 200. For example, active agent 202 may operate biometric scanner 206 to identify a prospective user of device 200 prior to granting access to device 200 to the prospective user. In another example, active agent 202 may periodically operate biometric scanner 206 to identify a user of device 200 and an authorized user stored in user login information 204. In another example, active agent 202 may cause device 200 to remain isolated from other devices within an enterprise system (e.g., enterprise system 100, FIG. 1) until an authorized user is identified using biometric scanner 206 and information from user login information 204. In one example, users identified by biometric scanner 206 may have different levels of access to the enterprise system based upon information stored within user login information 204. Biometric information obtained from a user may be utilized within additional data extensions of the PKI certificate to further the quality of data used for identifying devices and/or users in agent cells and peer-to-peer networks. Biometric information may provide a quality value for establishing an identity, a role and a trust level for a device in the network, as discussed below.

In another embodiment, device 200 may include a global positioning system (GPS) receiver 208 that determines a current location of device 200 based upon satellite signals. The determined location of device 200 may be used to determine trust. In one example, if device 200 is removed from a known secure location, active agent 202 within device 200 may disable device 200. In another example, the enterprise system may determine the level of access granted to device 200 based upon the location of device 200 determined by active agent 202 using GPS receiver 208.

Implementation of Authentication and Trust

Agent authentication and authentication of a device may be implemented through digital certification. When a device attempts to join an enterprise system network, it must first have an active agent (e.g., active agent 116, 118, 120, 122, FIG. 1). The active agent analyzes the device to collect pertinent information as to the profile of the hosting device (i.e., the device attempting to connect to the enterprise system). The active agent then sends the profile information to the T2SPA (e.g., T2SPA 108) requesting authentication. The T2SPA, if satisfied with the device's profile information, may then issue an agent authentication certificate that is digitally signed by the T2SPA to the device. This agent authentication certificate is based upon public key infrastructure (PKI) (know in the art) that provides encryption and certification mechanisms.

Identity and Role Protection Within an Enterprise System

Identity and role protection refer to the protection of agent trust credentials against forgery, impersonation, or use in excess of the authority granted by the credential. Agent trust credentials can be authenticated as valid and properly issued, and once issued, can't be used by actors other than the one to which it was issued, and can't be modified or misused by the actor. The agent trust credentials are subject to repeated validation and verification, such that if they are compromised or misused, they can be limited or revoked. Since the agent trust credential forms the foundation of trust within the enterprise system, it must be as secure as possible. Although it is not possible to prevent every possible attack, all direct approaches to forgery, impersonation, or modification are rendered cryptographically difficult.

Agent Communication

Agents within an enterprise system may communicate through a SSL connection, or may utilize an open connection. For example, agents may utilize an asymmetric key system to encrypt and digitally sign messages, if necessary. In another example, messages may be encoded using a Binary Markup Language (BML), which is a binary encoding of XML and thus reduces message size as compared to XML messages. Further, even when used over open connections, BML makes decoding of messages by unauthorized parties difficult due to its binary nature. BML is described below.

Agent Trust Credential

Figure 3:
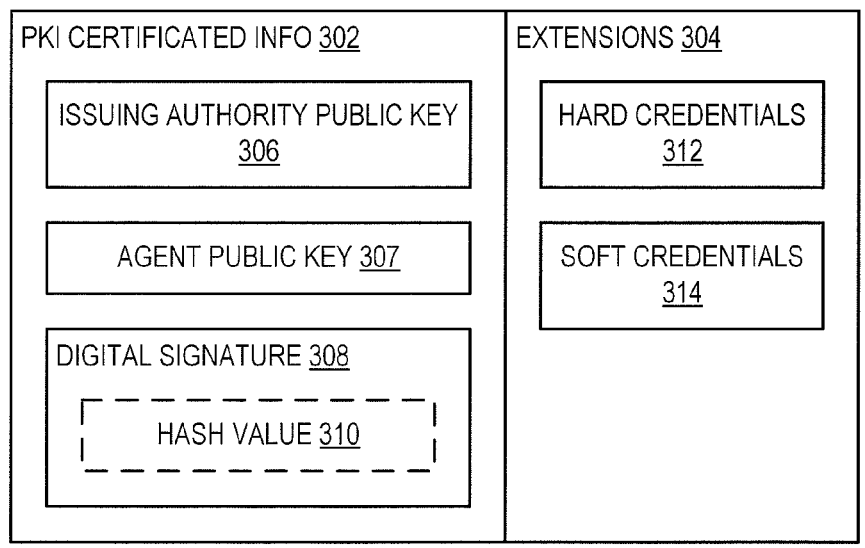
FIG. 3 shows one exemplary agent trust credential illustrating exemplary use of a PKI certificate with a certificate extension.

When agents are authenticated onto the system, an agent trust credential (e.g., agent trust credential 124, 125, 126, 127 and 128, FIG. 1) is issued to the agent, providing the agent with a certain level of trust within system 100. FIG. 3 shows one exemplary agent trust credential 300 illustrating exemplary use of a PKI certificate 302 with a certificate extension 304. In particular, PKI certificate 302 is shown containing a public key 306 and a digital signature 308 of the issuing authority. Digital signature 308 contains a hash value 310 that is generated by the issuing authority (e.g., T2SPA 108, 110, FIG. 1). Digital signature 308 and hash value 310 are used to prove authenticity of agent trust credential 300 and that agent trust credential 300 has not been modified.

Certificate extension 304 is illustratively shown with hard credentials 312 and soft credentials 314. Credentials 312 and 314 specifically identify characteristics of an agent and its operating environment. For example, hard credentials 312 may include a MAC address, a CPU hardware type and serial number, a motherboard type and serial number, memory size, type and configuration and hard drive size, type and serial number. Soft credentials 314 may, for example, include a user identification and password, biometric information of a user, smart card information, allowed processes, registry entries, and an agent ID. Specifically, credentials 312 and 314 describe characteristics of a device. If one or more characteristic of the device change, the active agent operating on the device, or any other agent within the system, may detect this non-compliance by comparing current characteristic values of the device to those specified in agent trust credential 300. For example, T2SPA 108, FIG. 1, may periodically request each active agent 116 and 118 to submit for re-authentication. Active agents 116 and 118 may then interrogate hardware and software of device 117 and 119, respectively, to prepare hard and soft credentials for evaluation by T2SPA 108. If hard and/or soft credentials of devices 116 and 118 change such that the device becomes non-compliant with system policy, agent trust credential 300 may be revoked for the non-compliant device, preventing it from accessing system 100, for example.

In one example of operation, hash value 310 is generated by processing at least part of agent trust credential 300 using a hash generating algorithm. Hash value 310 is then encrypted by the issuing authority, using its private key, to form digital signature 308.

The validity of agent trust credential 300 may be checked by decoding digital signature 308, using public key 306, to obtain the original hash value and comparing this value to a new hash value generated using the same algorithm and the current content of the agent trust credential. If the original hash value and the new hash value differ, the content of the agent trust credential has been modified and cannot be trusted.

The realm controller may host the root trust authority for the system and the root trust authority may issue agent trust credentials that permit the requesting agent to participate in the realm managed by the T2SPA also hosted by the realm controller. Human interaction may be required to authorize the root trust authority to issue an agent trust credential.

Agents within an enterprise system may validate that an agent trust credential (of another agent, for example) was issued by the proper root trust authority and has not been modified since issue, to within cryptographic certainty, both with and without direct interaction with the root trust authority within the realm controller.

Agents within an enterprise system may validate that an agent trust credential is being presented by the agent to whom the agent trust credential was originally issued, to within cryptographic certainty, by verifying the digital signature of the T2SPA within the agent trust credential.

Agents within an enterprise system are able to determine the proper role of an agent presenting an agent trust credential by analyzing and verifying the presented agent trust credential.

Any agent that includes enabled 'isolation' functionality and operating within the Enterprise system may receive a message (e.g., from a C&CC or a T2SPA) instructing the agent to block traffic to and from a particular device on the network, irregardless of whether the device to be blocked includes an agent or not. For example, once each agent within the Enterprise system has received the message, the particular device would then be isolated from the Enterprise system (i.e., isolated from each device that includes an agent).

Human interaction may be required to revoke (or remove authorization of) an agent trust credential.

Agents that have been issued an agent trust credential may periodically check with the root trust authority to renew their credential and/or verify that it has not been revoked. An agent whose agent trust credential has been revoked immediately erases the agent trust credential and any associated secret key material.

When a previously issued agent trust credential is revoked, it cannot be used to gain access to the system.

Agents in the enterprise system may periodically and/or randomly check with the root trust authority to determine if agent trust credentials of other agents within the enterprise have been revoked.

An agent whose agent trust credential has been revoked may later gain a new agent trust credential and rejoin the Enterprise system without losing state. That is to say, the state (i.e. hardware profile, etc.) of a device may be kept intact by the agent operating on the device even if the credential has been revoked by a C&CC or T2SPA for example. Revocation of the agent trust credential only removes the trust of the device within the Enterprise system. For example, the device may be isolated from the Enterprise system before or after revocation of the agent's agent trust credential in order to automatically or manually determine if the device has been compromised (i.e., before determining if the device is in a good state or a bad state).

Any two agents with agent trust credentials in the same system may use their agent trust credentials to negotiate a secure, encrypted communication channel, without the use of additional public key infrastructure (PKI) or secure sockets layer (SSL) elements. For example, once agents exchange agent trust credentials and a certain level of trust between the agents is established, an open (unencrypted) communication path between the agents may be utilized with a binary markup language (BML) communication protocol.

A T2SPA or other agent within the system may verify whether the relevant machine state has changed for an actor that is presenting an agent trust credential. For example, when a first agent presents its agent trust credential to a second agent, the second agent may validate the agent trust credential with the T2SPA, and may interact with the second agent (e.g., using a zero-knowledge authentication protocol) to determine whether characteristics of the second agent have changed since issue of the agent trust credential.

If the second agent determines that the relevant machine state of the first agent has changed, the second agent raises an alert regarding the first agent, even though the agent trust credential has not been revoked.

If, upon decrypting the agent trust credential, the second agent determines that it is invalid, the second agent raises an alert regarding the first agent.

Agents may also use normal SSL for communication between agents and realm controllers, however, an agent trust credential exchange system is preferred. The agent trust credential exchange system utilizes a Binary Mark-up Language (BML) protocol to exchange information between agents. Alternatively, eXtensible Markup Language (XML) protocol may be used to exchange agent trust credential information between agents. The BML and XML protocols may utilize encryption for additional security within the Enterprise system.

Each realm controller may host a local certificate authority, having the ability to sign a certificate. In this manner instead of an agent creating a self-signed certificate and adding it to its trust store, the agent will instead prepare a certificate request to be signed by the realm controller. The certificate signed by the realm controller will then be added to the agent's trust store and used for subsequent communication with either the realm controller or to another agent.

In the example of FIG. 3, PKI certificate 302 with extension 304 is used to extend the trust model. By including hard and soft credentials 312, 314, the Enclave trust model is extended to incorporate the concept of "Level of Trust" and/ or providing a mechanism to authorize or restrict an agent to certain functions.

Agent Trust

When two agents communicate directly with one another, it is advantageous for each agent to know how much it may trust the other agent. The level of trust is, for example, based upon known factors of the agent and the hosting device. A root trust authority has a known level of trust, since it is located within a trusted device, such as a ream controller, and may therefore issue agent trust credentials. In one example, the root trust authority may issue a trust credential to a T2SPA (e.g., T2SPA 108, 110, FIG. 1), which in turn may issue trust credentials to other agents that provide sufficient evidence of trust worthiness within the enterprise.

Figure 4:
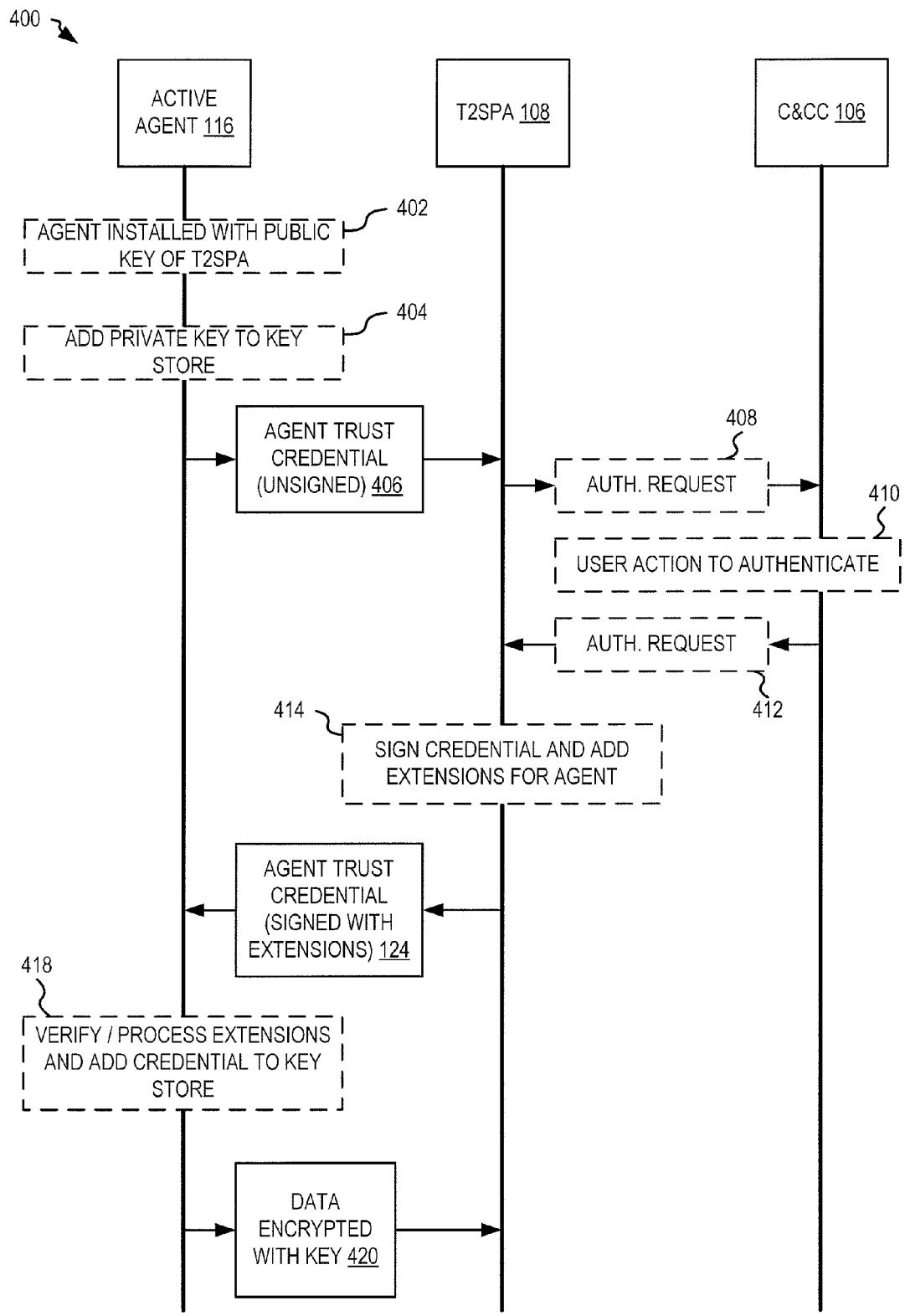
FIG. 4 shows exemplary transactions between active agent, Type 2 Super Peer (T2SPA) and C&CC during authentication of active agent 116.

FIG. 4 shows exemplary transactions between active agent 116, T2SPA 108 and C&CC 106 during authentication of active agent 116. Active agent 116 is installed with a public key of T2SPA 108 that allows active agent 116 to verify digital signatures created by T2SPA 108. Active agent 116 also has a private key and a public key pair, which it generates for itself using a known algorithm (e.g., PKI). The private key is stored within active agent 116 and is not made available externally to active agent 116.

Active agent 116 collects profile information of device 117, typically upon initialization of device 117. For example, active agent 116 may perform analysis of device 117 to determine its hard and soft credentials thereby forming a 'current profile' of device 117. These hard and soft credentials are included within an unsigned (i.e., unsigned by T2SPA 108) agent trust credential 406 (e.g., as hard credentials 312 and soft credentials 314 within agent trust credential 300, FIG. 3), together with the public key of active agent 116. Unsigned agent trust credential 406 is sent to T2SPA 108 to request authorization of active agent 116.

Upon receipt of unsigned agent trust certificate 406 from active agent 116, T2SPA 108 may evaluate hard and soft credentials 312, 314 within certificate 406 against a defined system policy of realm 102 to ensure compliance of device 117 and then notifies C&CC 106, in message 408, that active agent 116 is requesting authentication. Message 408 may, for example, include details of non-compliance to the defined policy of realm 102 if so determined by T2SPA 108. In one embodiment, T2SPA 108 may determine if device 117 may be authenticated to a certain level of trust based upon hard and soft credentials 312, 314 of device 117.

In the example of FIG. 4, authentication is granted only by user action. That is, a user of C&CC 106 decides if active agent 116 may be authenticated. Agent authentication within C&CC 106 is described in further detail below with reference to FIG. 16. In step 410, the user may check the profile (i.e., hard and soft credentials) of device 117 against the defined policy of realm 102, and if the user determines that device 117 is compliant with the policy of realm 102, instruct C&CC 106 to send message 412 to T2SPA 108 indicating that authentication is granted for device 117.

In step 414, upon receipt of the authorization message from C&CC 106, T2SPA 108 may assign a unique agent ID to active agent 116 for inclusion in soft credentials of device 117. T2SPA 108 then digitally signs agent trust credential 406 using its private key, forming agent trust credential 124. T2SPA 108 may add agent trust credential 124 to an agent trust credential list. T2SPA 108 sends agent trust credential 124 to active agent 116.

Upon receipt of agent trust credential 124, active agent 116 may decrypt the digital signature within agent trust credential 124 to verify that the certificate extensions are correct and store its unique agent ID for future use. Active agent 116 may add agent trust credential 124 to its key store for future use. Agent trust credential 124 provides active agent 116 with a certain level of trust within realm 102 within realm 102.

When communicating with other devices within realm 102, active agent thus utilizes agent trust credential 124 as proof of its trust within realm 102. If, for example, active agent 116 wants to send data to T2SPA 108, it creates a data message 420 that includes agent trust credential 124, encrypts message 420 using the public key of T2SPA 108 and digitally signs message 420 using its private key.

T2SPA 108, upon receipt of message 420, may verify authenticity and trust of device 117 by decrypting message 420 using its private key, and checking that agent trust credential 124 has not been modified by using the digital signature 308 therein. Any agent within a realm may request a current device profile from any other agent for verification against the agent's agent trust credential. If the current device profile does not match the hard and soft credentials within the agent trust credential, the agent may raise an alert by informing C&CC 106 and/or T2SPA 108, which may then revoke the agent trust credential.

T2SPA 108 may also maintain a revoked agent trust credential list that identifies agent trust credentials that have been revoked. When an active agent receives an agent trust credential from another agent, the active agent may verify, by contacting the T2SPA, that the agent trust credential is still valid. Specifically, each agent trust credential identifies the issuing T2SPA (e.g., T2SPA 108) which may, if necessary, be contacted to determine the validity of the digital certificate.

Levels of Trust

Each agent trust credential may also include information that identify and authorize additional trust roles. For example, each item within the hard and soft credentials within the agent trust credential may have a certain weighting upon the level of trust given to the device. For example, upon comparing the hard and soft credentials for a current device profile to the determined realm policy, any variation from the specified policy requirement for each item within the hard and soft credentials may reduce trust of the device based upon a weighting for each item. That is, each item that differs from policy results in reduced trust based upon the importance of the item itself and the determined difference from policy.

Realm Controller Single System Image (SSI) Clusters

Greater reliability and process scalability is achievable due to parallel, independent access to a shared resource pool. SSI Clustering technology effectively allows multiple servers to join together to create a single, highly capable, highly available environment. This environment replaces a single server thus eliminating a single point of failure. To achieve this architecture, two or more physical servers combine to represent a single realm controller, providing failover and redundancy as well as improved performance.

Single System Image clustering is done entirely at the Operating System level. It is not necessary for enclave itself to be aware of the cluster configuration. From the point of view of the Enclave program, it is simply running on a highly redundant server.

Figure 5:
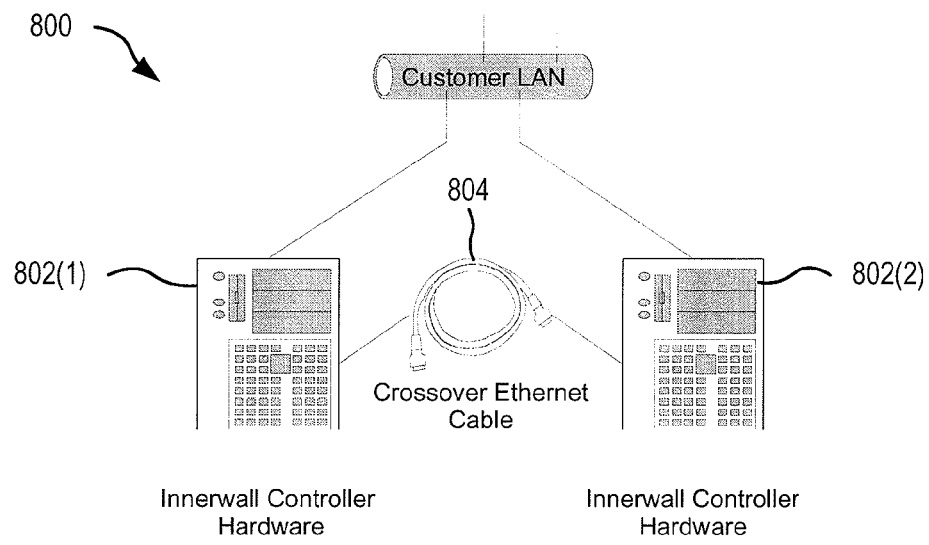
FIG. 5 shows on exemplary configuration of two computer systems that operates as a realm controller Single System Image (SSI) cluster.
Figure 6:
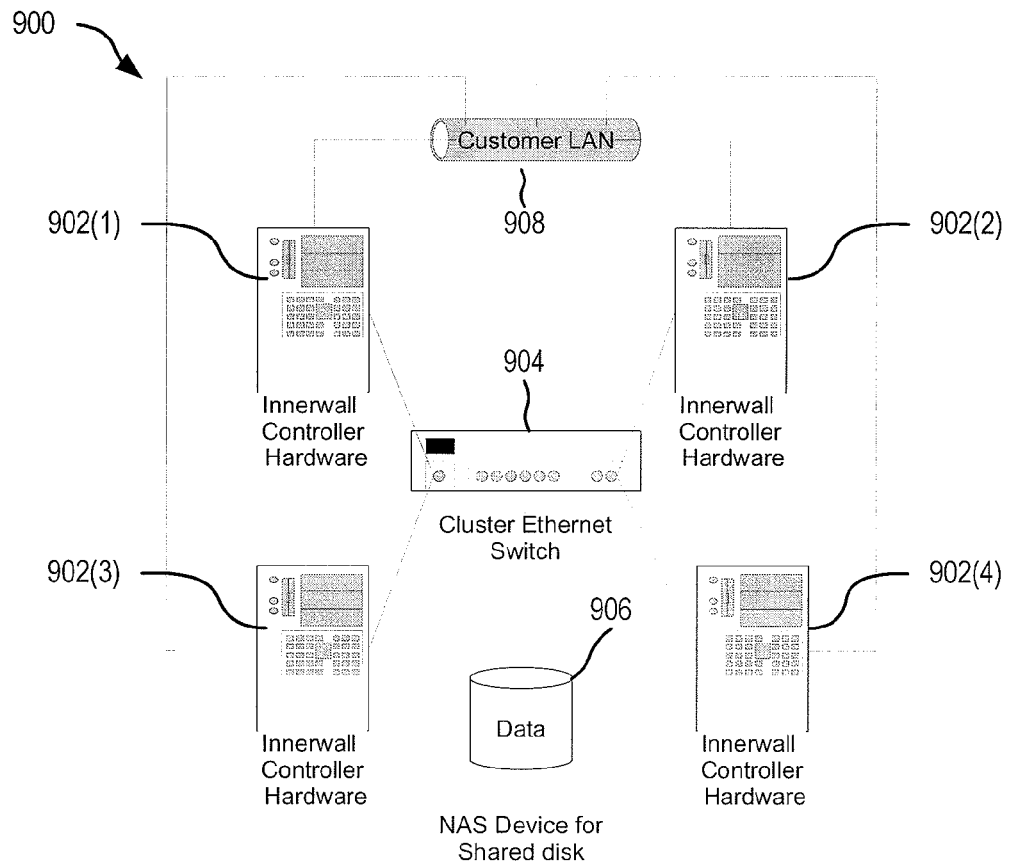
FIG. 6 shows one exemplary configuration of four computer systems that operate as a ream controller SSI cluster.

FIG. 5 shows on exemplary configuration 800 of two computer systems 802(1, 2) that operates as a realm controller SSI cluster. In configuration 800, computer system 802(1) connects directly to computer system 802(2) via a crossover Ethernet cable 804. FIG. 6 shows one exemplary configuration 900 of four computer systems 902(1, 2, 3, 4) that operate as a ream controller SSI cluster. In configuration 900, computer systems 902 connect to a cluster Ethernet switch 904, which in turn connects to a network-attached storage (NAS) data storage device 906. Each computer system 902 also connects to customer network 908.

Each computer system (e.g., computer systems 802, 902) has a least two NIC cards (one for standard network connectivity and one for cluster management). The two options are as follows:

1) Cluster pair, as shown in FIG. 5, includes two servers 802—No additional hardware is needed (other than a crossover Ethernet cable 804 to connect the two servers together).
2) More than two servers 902, as shown in FIG. 6, require additional hardware to form a cluster, including:
    a) Dedicated Gigabit Ethernet switch (e.g., Ethernet switch 908) for switching cluster control and NAS data, and
    b) Dedicated NAS device (e.g., NAS Device 906) for storing the common file system (to be shared among nodes—i.e., computer systems 902)

SSI Cluster configuration may be done as a deployment step while building the realm controller servers and prior to installing security software.

SSI clustering is a modular design, which enables flexible investment, deployment and management of system and storage resources, while providing seamless scalability ranging from small two-node clusters to large supercomputing environments. This technology provides transparent high-availability (redundancy and failover) capabilities and automatic load leveling to maximize efficient utilization of the resources of each of the cluster members.

In one exemplary architecture, each cluster member may be a Linux server running Fedora Core 3 (or later) and an OpenSSL clustering package. A cluster has at least two member servers. In one example, a realm controller cluster may scale to include hundreds of servers. Even a cluster including only two servers provides a very high degree of redundancy and reliability; a cluster including several servers is more advantageous for situations where very high performance is required (e.g., for use in an enterprise system that has hundreds of active agents operating within a single realm).

Cluster Data and File Systems

When the realm controller is formed as a cluster, data and file systems must be common throughout the cluster environment. Specifically, each cluster member must share the same storage medium. Where the cluster has more than two servers, a NAS device may be used as data storage medium, such that each of the servers that form the cluster may access the data storage medium. For a cluster pair (i.e., only two computer systems forming the cluster) this is not necessary since both computer systems may implement a distributed replicated block device (DRBD) using both of their file systems. With DRBD, a file system of one computer is mirrored on the other computer system thereby providing full file system redundancy between the computer system pair. Since this functionality is not available beyond two servers, a NAS (e.g., NAS device 908) may be used where the cluster includes more than two computer systems.

Cluster Failover and Recovery

If a hardware failure occurs on one server of a realm controller cluster, operation of the realm controller continues without interruption using the remaining servers of the cluster. When the hardware failure is corrected, the server is restored to service (optionally involving a system administrator) and may automatically rejoin the cluster, thereby restoring full redundancy to the realm controller. On the other hand, if a realm controller hosted by a single server incurs a hardware failure, operation of the realm controller is disrupted; a delay occurs while the failure is diagnosed and repaired before operation of the realm controller resumes.

BotNet Protection System

Typically, prior art protection software, (i.e. virus, malware, spyware, and root kit detection systems) only recognizes known infections given prior knowledge of the infection signature (i.e., it uses signature based detection), and is therefore ineffective against a new Bot attack until the protection software acquires the signature of the new Bot.

Further, this prior art protection software also operates to detect an attack by monitoring the system for damage; thus detection thus occurs after damage is inflicted. Although current protection software may detect certain malicious parasites, computer systems are still vulnerable to mapping Bot and other types of attacks.

Components of BotNet Protection

One or more of the following components may be used to form BotNet Protection, and are each discussed below.

Peer-to-peer Agent Community Protection
Keystone Real-time Active Detection and Remediation
Virtual Security Fences (VSF) Technology
Peer-to-Peer Agent Community Protection Using a community or 'Neighborhood Watch' method of detection, one or more agents are installed within devices of an electronic network. The agents make an initial assessment of the electronic network to determine normal activity, and then the agents monitor the electronic network for abnormal activity. Upon detection of abnormal activity, the agents may isolate affected devices and/or block the abnormal activity.

The agents are grouped into cooperative agent cells. A communications protocol within each cooperative agent cell allows communications between agents of the cooperative agent cell and communication with certain agents (e.g., cell delegates) external to the cooperative agent cell. The system has means for determining normal activity levels of the electronic network, means for detecting malicious activity, means for isolating compromised components of the electronic network, means for counter-intelligence to reveal the origin of the malicious activity, means for repairing damage caused by the malicious activity, means for determining vulnerabilities in the current protection provided by the plurality of agents, and means for improving protection to resist future attack on the electronic network.

Keystone Real-Time Active Detection and Remediation

Keystone is a real-time, signature-less policy violation detection and one-click remediation technology. Using this technology, a computer device is managed and monitored to a gold state of operation, wherein the device operates in a known safe and protected manner. If any differences to this gold state are detected, an alert is raised and the offending file, process and/or program is isolated, restored and/or removed. Keystone thus provides a signature-less detection system for removal of spyware, malware, viruses and bots. The device is returned to the gold state immediately, and propagation of the Bot or dissemination of sensitive information is halted.

When a device operating and communicating within a secure enterprise system is discovered to be non-conforming to system policy, it may be quarantined. For example, an active agent operating on the device may periodically check the device profile, and if it does not conform to the enterprise system policy, the active agent may itself quarantine the device, or other devices to which it connects may quarantine it. To remove the quarantine requires that the device be made to conform to the system policy again. To make the device conform to policy requires that any changes to the device that resulted in the failure to conform be undone. For example, if a user installs a program on his computing device, an active agent operating on the device may determine that his device's profile no longer complies with the enterprise system policy. To correct the problem, the user must remove the program such that his device again conforms to the enterprise system policy. However, when a program is installed, it often changes more than is restored upon removal of the program. Often the user will require a system administrator to restore his device to conformity.

In another example, a user takes a portable computing device home to do additional work, and while at home, the device becomes infiltrated by a virus from an email. Upon return to the enterprise system, the device will be non compliant because of the virus, and will therefore be denied access to the network. This again may require action by a system administrator to make the device to comply with the enterprise system policy.

One method of returning a device to a state that complies with system policy is to first take a snapshot of critical components (e.g., files and parameters) within the device while in compliance to the system policy, and then restore these critical components from the snapshot, if the device becomes non-compliant to system policy, to restore compliancy.

Figure 7:
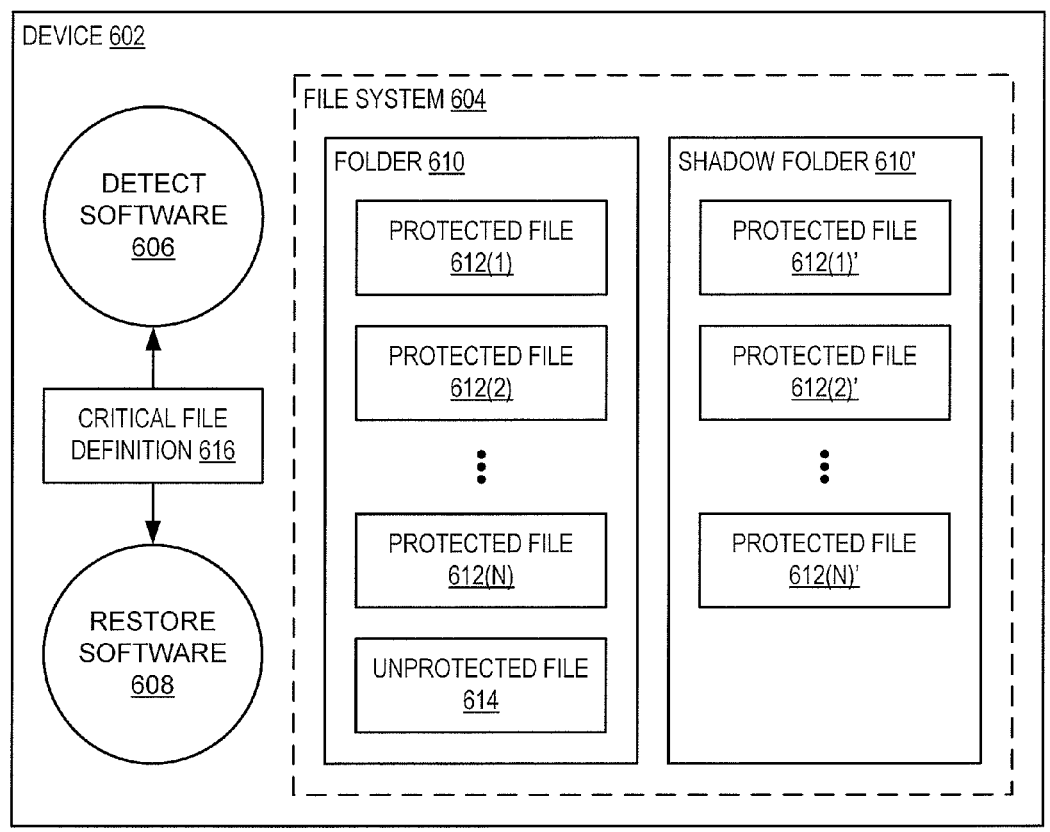
FIG. 7 shows one exemplary device that has a file system, detect software and restore software.

FIG. 7 shows one exemplary device 602 that has a file system 604, detect software 606 and restore software 608. Device 602 is, for example, a personal computer, notebook computer, desktop computer, PDA or other such device. File system 604 is illustratively shown with a folder 610 that contains protected files 612(1-N) and an unprotected file 614. A critical file definition 616 specifies which files within file system 604 are to be protected from change, and which folders within file system 604 may not be modified. Critical file definition 616 may, for example, also specify which file extensions may be modified and which may not.

In one example of operation, detect software 606 first takes a snapshot of critical system files within file system 604, when device 602 is compliant with enterprise system policy, and stores a copy (shown as protected files 610(1-N)') of protected files 610 in a shadow folder 610' within file system 604. During normal operation of device 602, detect software 606 monitors file system 604 for changes to file system 604 that are not permitted. Upon detection of such a change, the use of device 602 may be notified of the non-compliance to system policy and prompted to restore device 602 to a compliant state. Optionally, detection software 606 may immediately invoke restore software 608 to restore device 602 to a compliant state once non-compliance is detected. In one example, upon each reset of device 602, restore software 608 always restores device 602 to a compliant state. When detect software 606 detects non-compliance it immediately resets device 602, thus stopping further corruption, and restoring device 602 to a compliant state.

In one embodiment, detect software 606 and restore software 608 operate within an active agent (e.g., active agent 116, FIG. 1) running on device 602.

Virtual Security Fences

Virtual Security Fences (VSF) is a software implementation of a concept of switch based enterprise virtual local area networks (VLAN's). It can also be considered to be a device based distributed and managed firewall. With VSF, if a protected device (i.e., a trusted device within the enterprise system) attempts to connect to a non-trusted device (i.e., a device external to the enterprise system), or if a non-trusted device attempts to connect to a trusted device within the enterprise system, an alert is triggered indicating activity outside of acceptable system policy. Such policy violation may result in isolation of, and loss of trust in, one or more devices within the enterprise system. For example, when a device loses trust, other devices within the system are informed such that communication with the device terminates. The enterprise system may therefore isolate any device, even if that device is not running an active agent. Where the device is running an active agent, any agent trust credential issued to the active agent is revoked, thus effectively removing the device from the enterprise system.

Hardware-based VLAN technology is usually based on configuring different groups of machines on different subnets, then limiting access based on subnets. VSF functionality is more freeform and will lend its utility very strongly in peer-to-peer trust communities.

Additionally, by managing device identities independently of IP addressing schemes, agents may monitor two-way device traffic for indications of information theft by Bots and spyware and use VSF technology to isolate offending devices.

Multi-factor binding to hardware eliminates the dependencies on IP addressing for device identification, allowing VSF and peer-to-peer to work cooperatively in IPV4 and IPV6 environments. For example, the use of hard credentials (e.g., hard credentials 312, FIG. 3) and soft credentials (e.g., soft credentials 314, FIG. 3) to determine the identity and authenticity of a device connecting to a network provides greater security than only an IP address.

Figure 8:
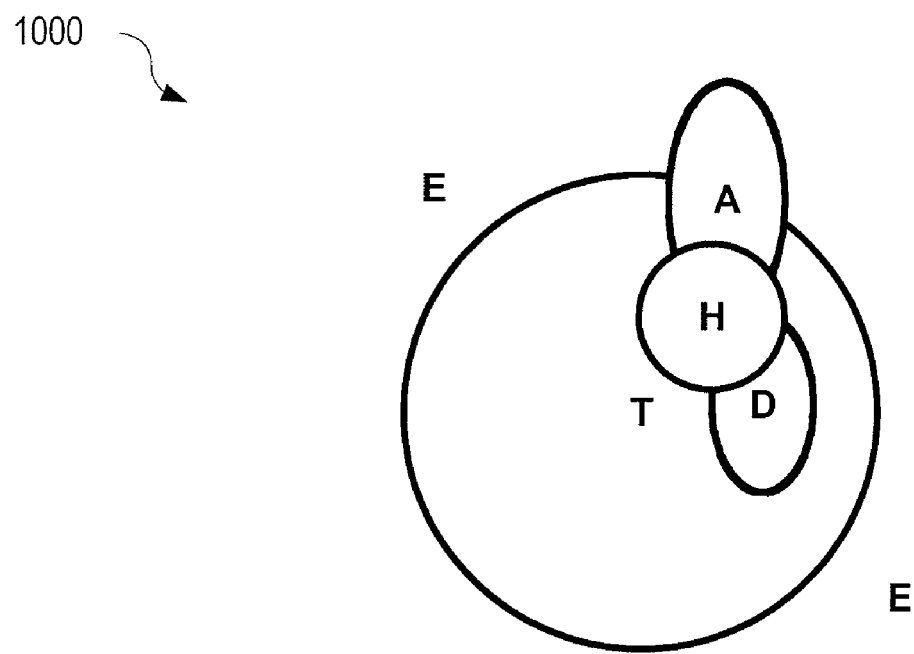
FIG. 8 shows an area chart illustrating exemplary policies of one enterprise system.

Network Registration and VSF Policies:

FIG. 8 shows an area chart illustrating exemplary policies of one enterprise system. For example, area H represents is a space in which a device C operates and considers its home; area T represents the space that communications to and from device C are trusted implicitly; area A represents the space that communications to and from device C are allowed outside of T and H; area D represents the space within area T that any communications to and from device C are not permitted; and area E represents an area external to area T that is considered not trustworthy and with which communications to and from device C are not permitted. The following exemplary rules may be drawn from FIG. 8.

1) A Computing device (C) is any element of $\{C|C_1, C_2, C_3 \ldots C_n\}$ and any C is an element of system A in FIG. 8.
2) A space is defined as a set that includes or is equivalent to a set, a subset, network, sub-network, device or set of devices.
3) The following (H, T, A, D, and E) are defined a spaces with individual rules and properties
4) HomeNet (H)—This describes the space in which a device C operates and is considered home. (C is always an element of H ($C \in H$) and H is always a subset of T ($H \subset T$) therefore ($C \in T$)).
5) TrustNet (T)—Describes the space that communications to and from device C are trusted implicitly ($A \subset T$, $A \cap D$. $C \in T$ iff $C \in A$ and $C \notin D$)
6) AllowNet (A)—Describes the space that communications the and from C are allowed outside of T and H, and which may include $A \cap E$. H ($C \in H$)
7) DenyNet (D)—Describes the space that any communications to and from C are absolutely denied. If $C \in D$, then $C \notin T$.
8) ExternalNet (E)—Any subset, network or device not included in T is considered not trustworthy unless by exception, it is included in A. ($A \subset E$, $H \not\subset E$ and $D \not\subset E$. Furthermore $C \in T$ iff $C \notin D$ or $C \notin E$)
9) PeerNet (P)—A self-configuration layer of agent occupying, but who's communications are neither determined by nor confined to spaces T, H, A, D or E where C is an element of any space. ($\{C \in P | P = T \cup H \cup A \cup D$ and $P = A \cap E\}$)

BotNet Protection Solution

Utilizing the components Secure Enclave, Peer-to-peer community protection, Keystone and VSF technology extensions, it will be possible to monitor, detect and halt the information theft posed by the propagation and installation of Bots in a computer network.

Scenario A: A Bot is installed through any type of distribution mechanism into and device $C_1$, residing in System A. An installed virus, spyware or malware system does not detect The Bot because its signature is unknown. Secure Enclave Agent with Keystone technology is resident on $C_1$.

Protection Scenario A: Bot installation on $C_1$ is detected immediately through gold state policy violation. All devices C that are protected by Secure Enclave are notified that $C_1$ is in violation and devices C that are elements of P isolate $C_1$ from communicating in any space protected by P. $C_1$ is restored to gold state immediately isolate $C_1$ immediately. Once it has been determined that $C_1$ is in gold state compliance, $C_1$ may be allowed communications to P.

Scenario B: A Bot is installed through any type of distribution mechanism into and device $C_2$, residing in System A. An installed virus, spyware or malware system does not detect The Bot because its signature is unknown. Secure Enclave Agent with VSF technology is resident on C.

Protection Scenario B: Bot installation on $C_2$ remains undetected. As it is the missions of Bots to collect and send information to a data collector outside of T (E or D), any network traffic deemed to be in violation of policy triggers and alert devices (C) in P. VSF technology blocks outbound traffic emitting from $C_2$.

Additionally, all devices C that are protected by Secure Enclave VSF are notified that $C_2$ is in violation and devices C that are elements of P isolate $C_2$ from communicating in any space protected by P, or emitting into D or E.

Scenario C: A Bot is installed through any type of distribution mechanism into and device $C_3$, residing in System A. An installed virus, spyware or malware system does not detect the Bot because its signature is unknown. Secure Enclave Agent with Keystone and VSF technology is resident on $C_3$.

Protection Scenario C: In this protection scenario, both protection scenarios A and B apply. In a case where a Bot is installed on $C_3$ and for any reason remains undetected (Protection Scenario A fails), Protection Scenario B acts as a failsafe.

Scenario D: A Bot is installed through any type of distribution mechanism into and device $C_4$, residing in System A. An installed virus, spyware or malware system does not detect the Bot because its signature is unknown. Secure Enclave agent is not installed on $C_4$.

Protection Scenario D: Although an Enclave Agent does not reside on $C_4$ and Protection Scenario cannot apply, Protection Scenario B still applies as any device in P can detect and alert all devices C in P that a violation has occurred, isolating $C_4$ from communicating in P and eliminate the possibility of communication to or from both D and E.

Command and Control Console

Figure 9:
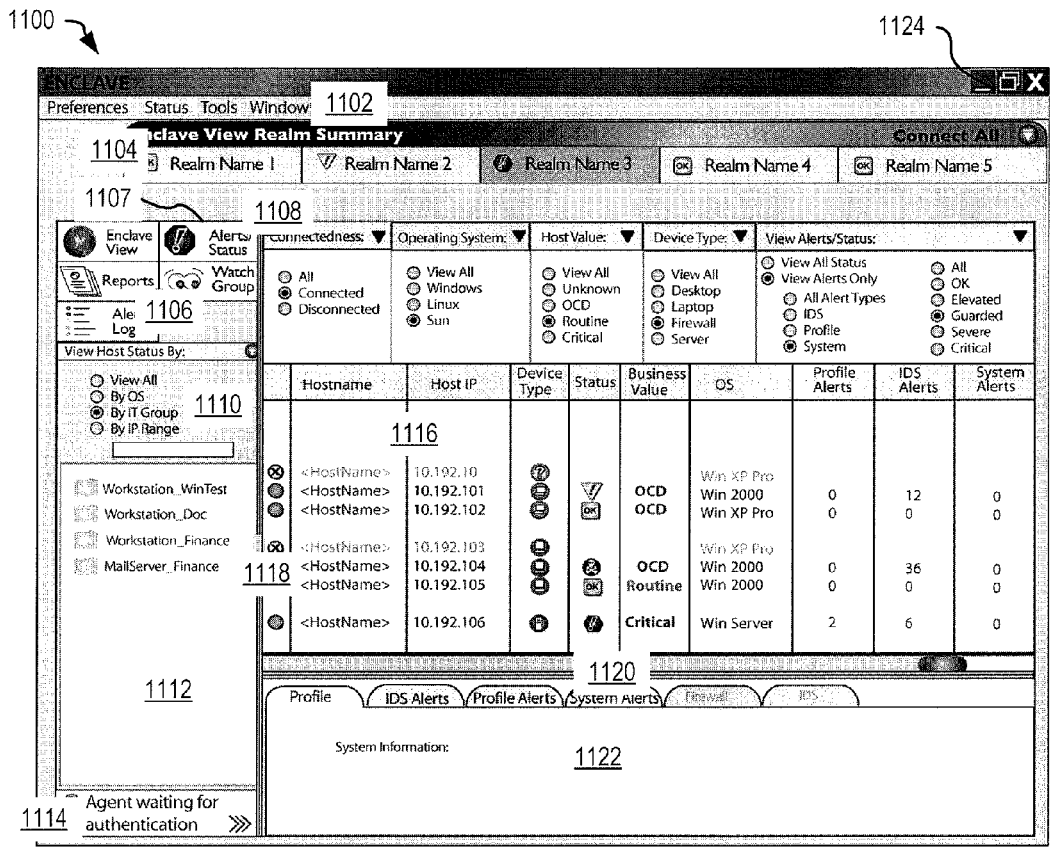
FIG. 9 shows one exemplary console window illustrating a menu, a realm bar, navigation buttons, filters and search parameters, selections, tree/icon navigation area, agent authentication notification area, data display area, horizontal window slider, vertical window slider and tabbed data display area.

FIG. 9 shows one exemplary console window 1100 illustrating a menu 1102, a realm bar 1104, navigation buttons 1106, filters and search parameters 1108, selections 1110, tree/icon navigation area 1112, agent authentication notification area 1114, data display area 1116, horizontal window slider 1118, vertical window slider 1120 and tabbed data display area 1122. Data display area 1116, horizontal window slider 1118 and vertical window slider 1120 are used to display selected data items to the administrator. For example, data display area 1116 may be used to display alert and status information, described in detail below.

Figure 10:
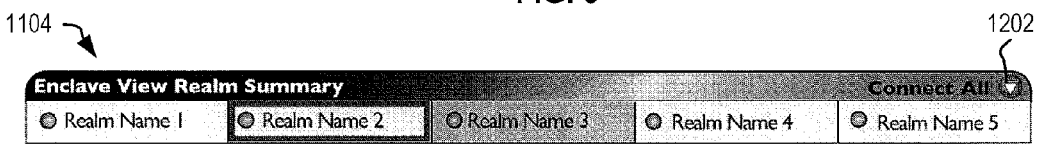
FIG. 10 shows the realm bar of FIG. 9 in further detail.

FIG. 10 shows realm bar 1104, FIG. 9, in further detail. Realm bar 1104 shows an "at a glance" overview of each realm's status. Optionally, other views within console window 1100 may be closed to give the administrator maximum use of their display area while maintaining visibility of security status. For example, realm bar 1104 may display an icon indicating if the associated realm is connected to or disconnect from a C&CC (e.g., C&CC 106, FIG. 1) and status of a highest alert type (yellow for IDS, red for Profile) of the associated realm. Realm bar 1104 may also display summary information for each displayed realm, which displays additional realm information when a mouse-over hover event occurs for a displayed realm. Mouse-over time for the pop-up window to display this additional information may be a configurable option. The additional realm information displayed may include: Realm Name, # IDS Alerts, # Profile change Alerts, # System Alerts and Total Hosts/Hosts Online.

Realm bar 1104 may also include one or more of the following features: a stand-alone ability to be displayed while other parts of console window 1100 are hidden, an ability to expand itself to show a configurable number of "rows" of realms when the system has more than five realms.

Figure 11:
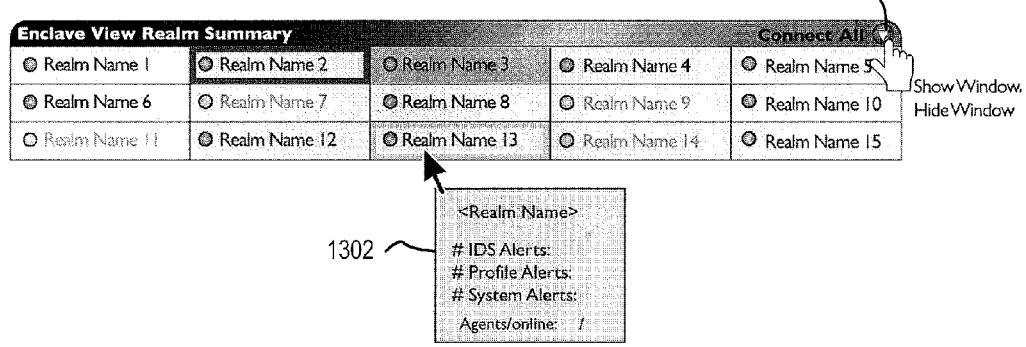
FIG. 11 shows an exemplary dropdown window that displays additional information about the realm.

The console window 1100 may be collapsed, leaving only realm toolbar 1104 that shows only high-level status for each realm. For example, the size of the console window may be changed when the administrator operates an input device (e.g., a mouse or tracker-ball) to select icon 1124. When collapsed to leave only realm toolbar 1104, console window 1100 may be re-expanded to return consol window 1100 to its size prior to collapse. Only one console window 1100 exists; its size may change, depending on whether or not the administrator wants to view all information about a realm or only the high-level status of the realms. When console window 1100 is collapsed, realm toolbar 1104 may not be resized. Status information for each realm may also remain at the top of console window 1100 when expanded. Each realm may also have a dropdown window 1302, FIG. 11, that displays additional information about the realm including one or more of: percentage of agents affected by IDS or profile alerts, number of affected hosts, trust level of the realm and risk coefficient.

Figure 12:
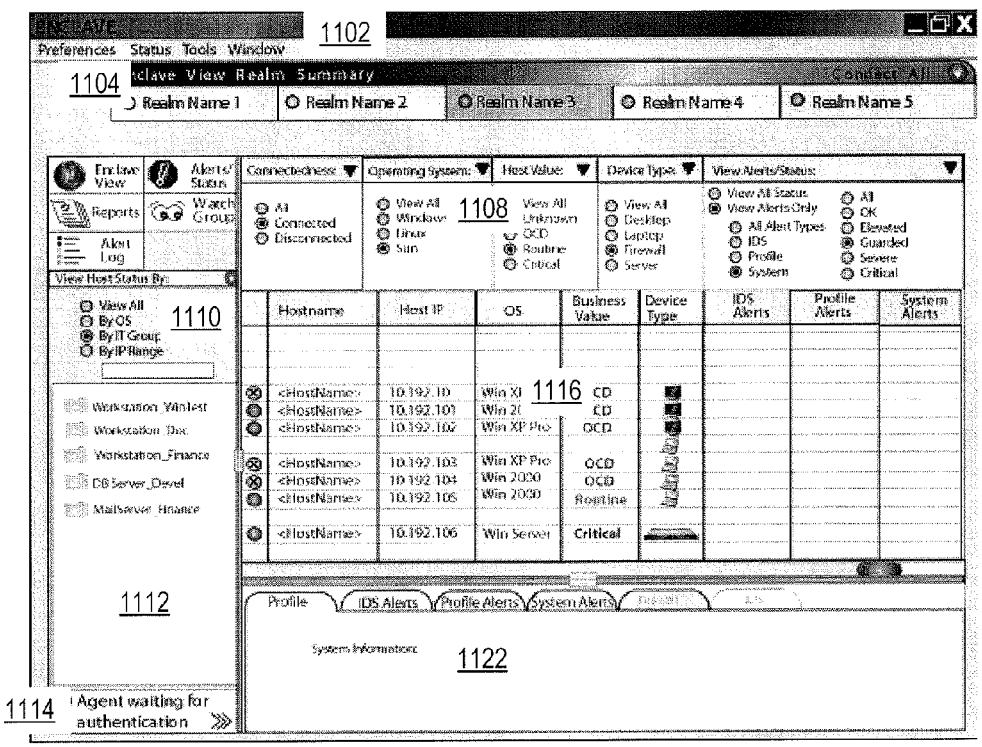
FIGS. 12 and 13 show exemplary views of the console window of FIG. 9 after selection of the alerts/status button.
Figure 13:
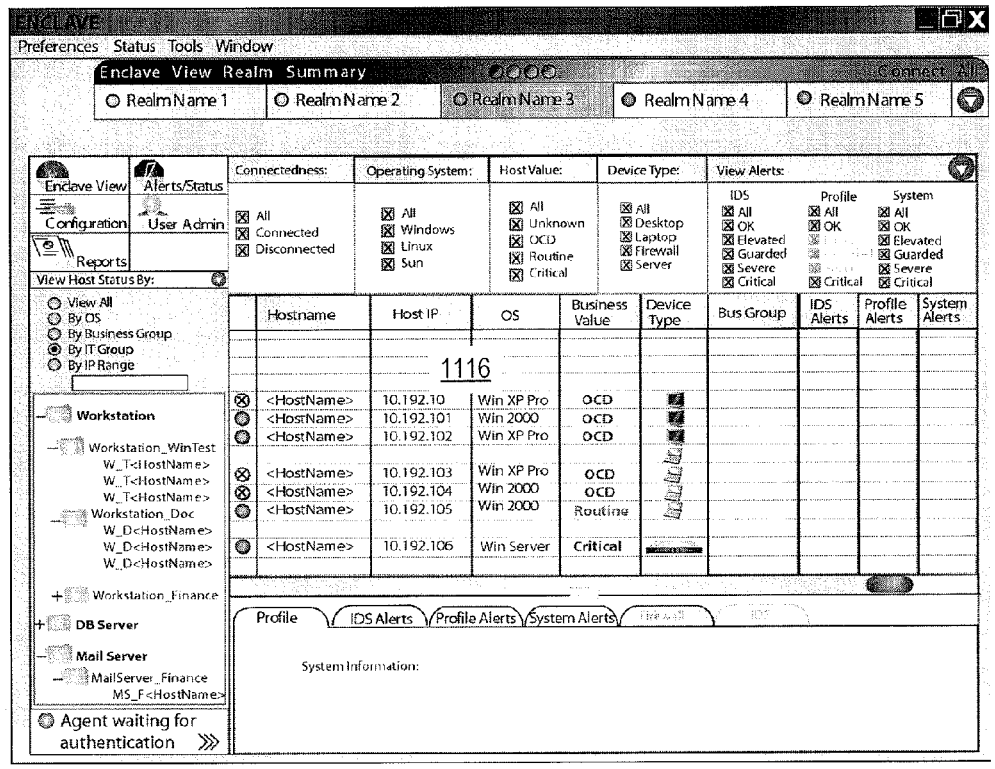

Navigation buttons 1106 facilitate selection of alternate views within data display area 1116. FIGS. 12 and 13 show exemplary views of console window 1100 after selection of alerts/status button 1107. A user of C&CC 106 (e.g., an administrator) may select additional display options for data display area 1116 though use of selections 1110. FIG. 12 shows one exemplary console window 1100 with data display area 1116 displaying alert and status information viewed by operating system (OS). FIG. 13 shows one exemplary console window 1100 with data display area 1116 displaying alert and status information viewed by IT group. Filters and search parameters 1108 may also be used to filter data displayed within data display area 1116, and may also provide search functionality that allows the administrator to quickly locate certain information for display within data display area 1116.

Tree/icon navigation area 1012 allows the administrator to quickly navigate through security system information. For example, the administrator may select one or more IT groups within tree/icon navigation area 1112, and associated information will be displayed within data display area 1116.

Agent authentication notification area 1114 may display an indication that one or more agents await authentication by a C&CC.

Figure 14:
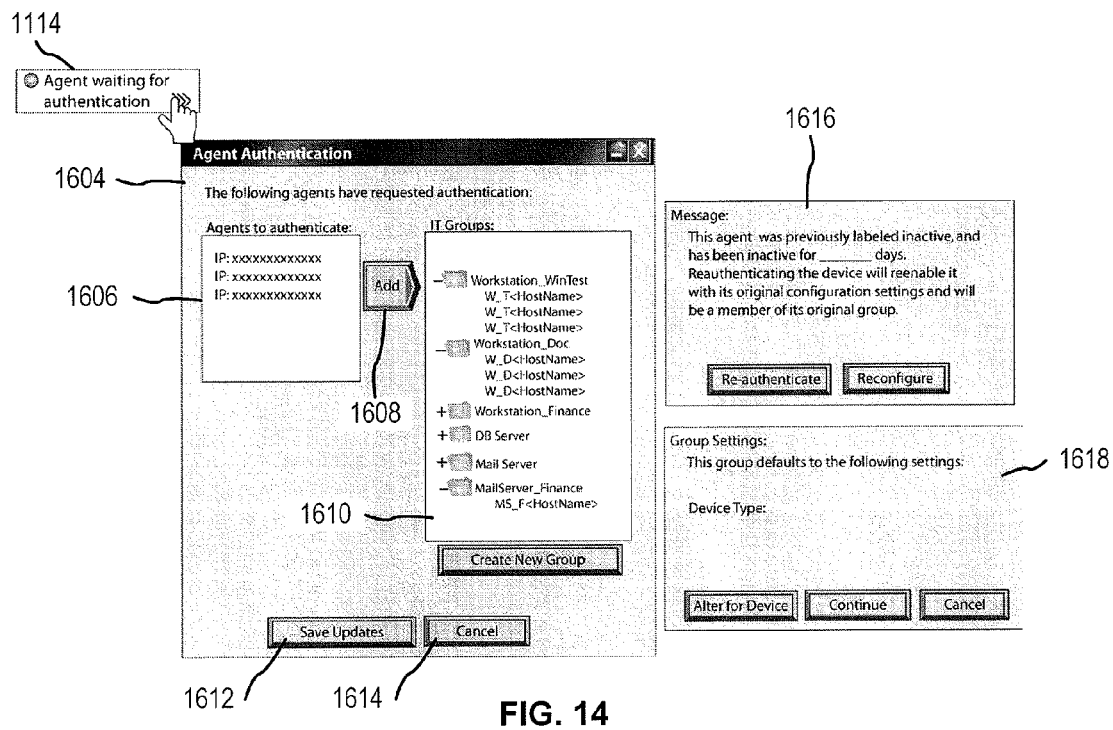
FIG. 14 shows an exemplary agent authentication window that is displayed upon selection of the agent authentication notification area within console window of FIG. 9.

FIG. 14 shows an exemplary agent authentication window 1604 that is displayed upon selection of agent authentication notification area 1114 within console window 1100. Agent authentication window 1604 shows an agent list 1606 of agents awaiting authentication, an IT group list 1610 of IT groups to which the agents may be assigned. In one example of operation, the administrator select one or more agents from agent list 1606, selects one IT group from IT group list 1610, and then selects add button 1608 to add the selected agents to the selected IT group. The administrator may also create a new IT group if desired. Additional information windows 1616 and 1618 may appear, upon selection of an agent from agent list 1606, to display information relative to the selected agent and allow re-authentication and/or reconfiguration of the selected agent. Upon selection of a save updates button 1612, the selected agents are authenticated and changes to configuration, if any, are saved. Alternatively, if the administrator selects a cancel button 1614, agent authentication window 1604 is closed without authenticating or changing configuration of any agents.

Tabbed data display area 1122, FIG. 9, includes tabs for displaying one or more of the following: profile, IDS alerts, Profile alerts, system alerts, firewall and IDS.

Figure 15:
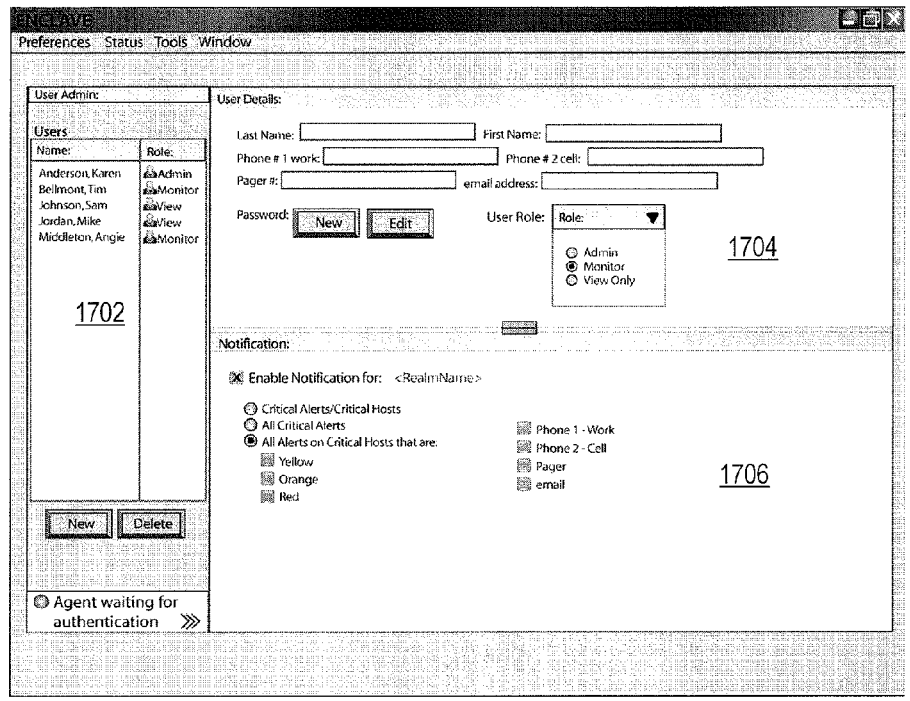
FIG. 15 shows one exemplary user notification window illustrating configuration of an automatic notification system.

FIG. 15 shows one exemplary user notification window 1700 illustrating configuration of an automatic notification system for informing a designated notification recipient of security status changes within an enterprise system (e.g., enterprise system 100, FIG. 1). In particular, user notification window 1700 has a notify list 1702 that lists used that have been configured to receive notifications, a user detail area

1704 that allows details of the user to be specified, and a notification area 1706 that allows the type of notification that the user is to receive to be specified.

Use of the automatic notification system removes any requirement for the administrator, or other users, to continually monitor the C&CC. If a security alert occurs within enterprise system 100, the automatic notification system may, for example, send a notification to one or more designated notification recipient. The notification may be one or more of an email, a page, a text message or a voice message. User notification window 1700 allows configuration of the automatic notification system for each designated notification recipient. For example, each designated notification recipient may have one or mode devices specified for receipt of the notification, and the type and/or level of alert for which notification is to be sent to the notification recipient. Such notification may be specified at a realm basis. The designated notification recipient may also be assigned a user role. The user role may define associated screen access rights and be one of: administrator, standard and viewer. Based upon the assigned user role, the designated notification recipient may perform one or more of the following functions:

View agents—all user roles;
Authenticate Agents—administrator and standard user roles;
View Alerts—all user roles;
Clear Alerts—administrator and standard user roles;
View Device Groups—all user roles;
Add/Update/Delete Device Groups—Administrator user role;
View Users—all user roles;
Add/Update/Delete users—Administrator user role;
View Rules—all user roles;
Import Rules—Administrator user role;
Export Rules—Administrator user role.

In another example, if a designated recipient is currently logged into the C&CC, only console alerts may be issued; on the other hand, if the designated recipient is not logged into the C&CC, the selected method(s) of notification delivery are used (e.g., email, page etc.). Notification may also depend upon alert type, alert severity, a business value of the device for which the alert occurs, a filter list and a realm list. For example, the designated recipient may create a filter to eliminate certain alerts. The filter may be saved, for later use. The designate recipient may also specify which realms notifications should be generated. For example, the designate recipient may be responsible for certain realms, while other designated recipients are responsible for other realms.

This configuration may also be used when the designated recipient is logged into the consol, thereby displaying only selected realm and alert information.

Figure 16:
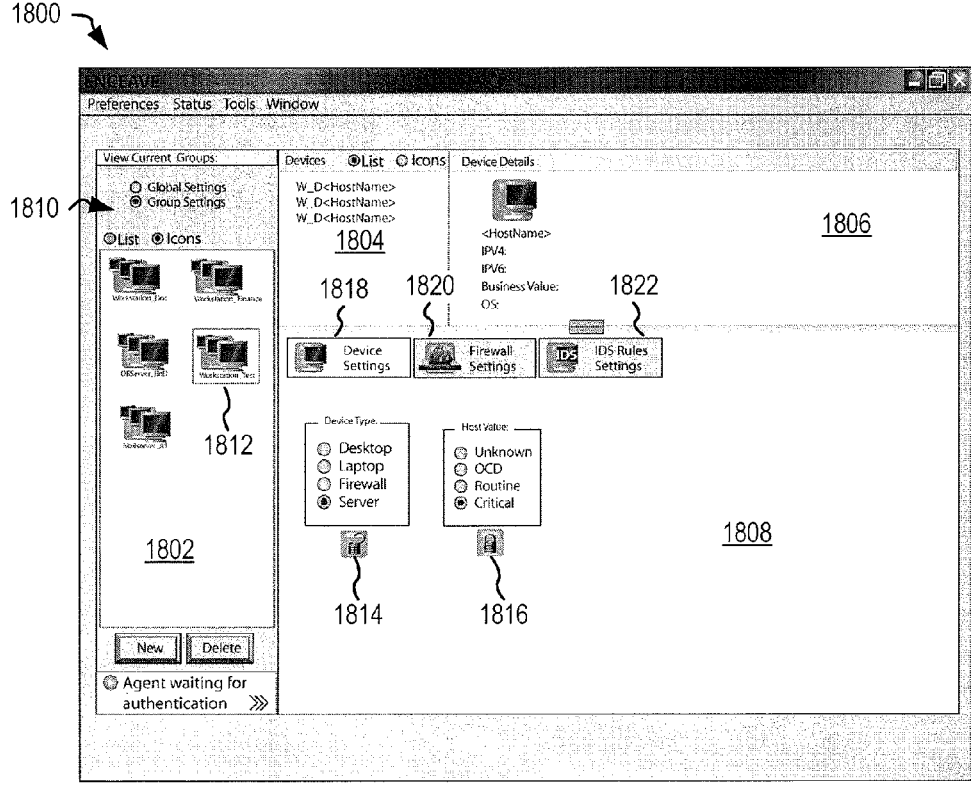
FIG. 16 shows one exemplary console window for viewing and entering configuration options.

FIG. 16 shows one exemplary console window 1800 for viewing and entering configuration options. Console window 1800 has a tree/icon area 1802, a device list area 1804, a device detail area 1806 and a configuration area 1808. A selection area 1810 allows selection of a mode of display for tree/icon area 1802. In one example of operation, tree/icon area 1802 is selected for display of icons and group settings. An administrator selects icon 1812, which in this example represents a group of workstations. A list of devices is displayed in device list are 1804, and by selecting one of the display devices, details of the selected device are displayed in device detail area 1806. Configuration area 1808 has three buttons: a device settings button 1818, a firewall settings button 1820 and an IDS rules settings button 1822. In the example of FIG. 16, device setting button 1818 is shown selected, and configuration area 1808 is shown displaying device type and host value configurations for the devices listed in device list 1804. Icon 1814 indicates that device type is unlocked and may be changed. Icon 1816 indicates that host value is locked and cannot be changed.

Figure 17:
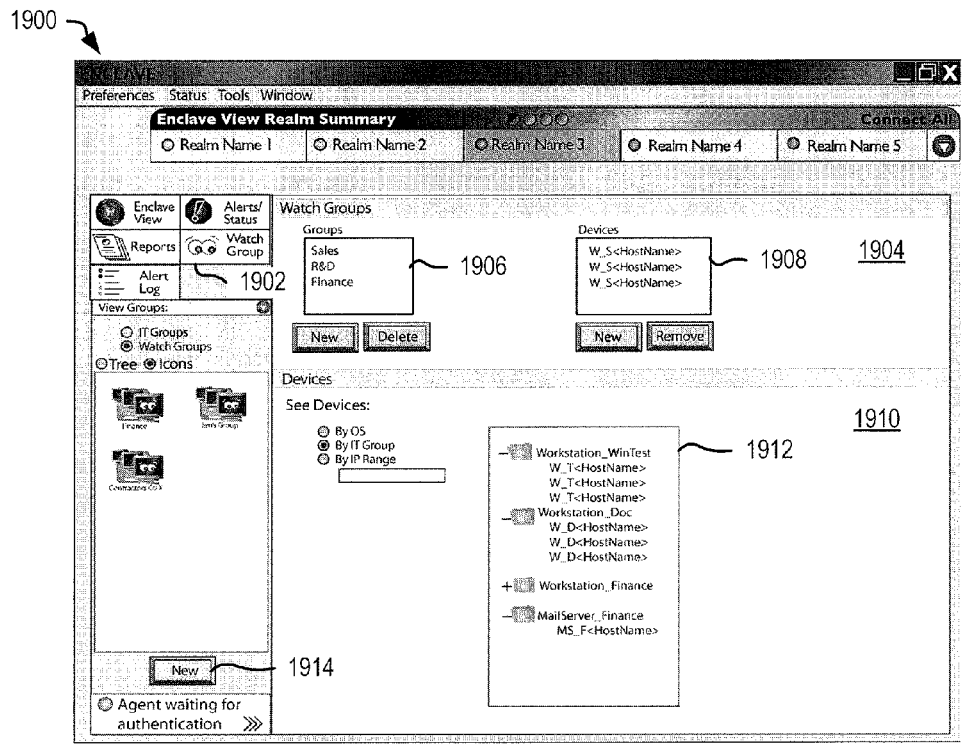
FIG. 17 shows one exemplary console window illustrating configuration of watch groups.

FIG. 17 shows one exemplary console window 1900 illustrating configuration of watch groups. Selection of watch group button 1902 displays watch group area 1904 and devices area 1900. Watch group are 1904 has a groups list 1906 and a devices list 1908. In one example of operation, if the administrator selects a group from group list 1906, the devices belonging to that group are listed in device list 1908. A tree/icon display 1912 within devices area 1910 may also be used to select devices for inclusion within the selected group of group list 1906. Selection of new button 1904 creates a new watch group within watch group list 1906, and devices may be added to the group using tree/icon display 1912.

Figure 18:
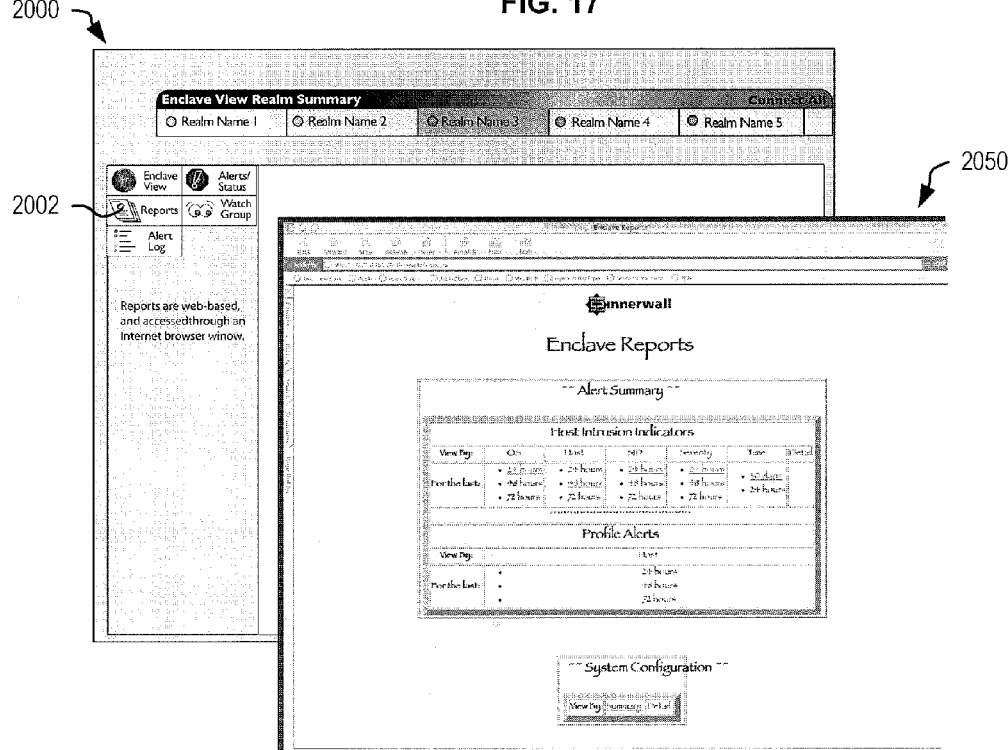
FIG. 18 shows one exemplary console window and a browser window.

FIG. 18 shows one exemplary console window 2000 and a browser window 2050. A report is, for example, initiated by selection of report button 2002 of console window 2000. Browser window 2050 is then opened (by initiating a browser tool, for example) to view the generated report. In one example of operation, console window 2000 interacts with an administrator, or user, to create a report which is then viewed using a browser tool, as shown by browser window 2050. In one example, a Jakarta Tomcat acts as a web server to create the report based upon information retrieved during interaction with the administrator/user and use of Jasper Reports APIs.

As described above and shown in FIG. 17, watch groups may be configured to include one or more devices. These watch groups allow an administrator to quickly select a group of devices to monitor on a watch display.

Figure 19:
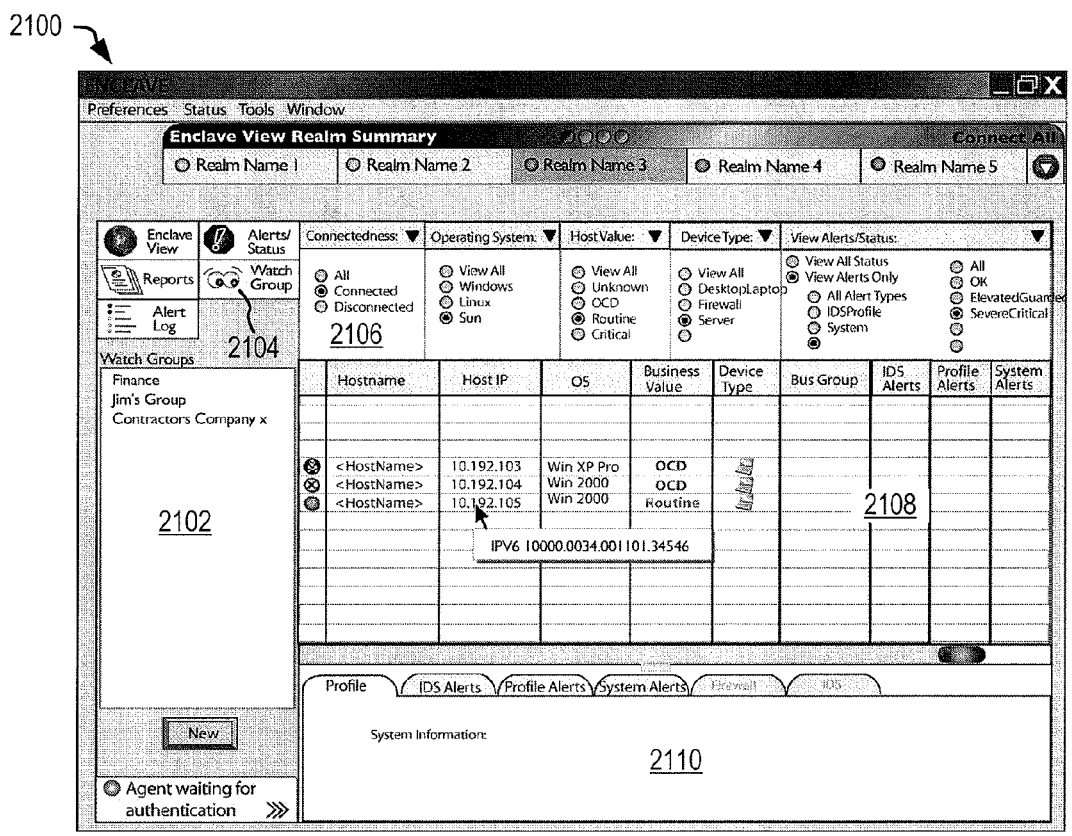
FIG. 19 shows one exemplary console window with a filter and search area, a detail display area and a tabbed display area.

FIG. 19 shows one exemplary console window 2100 with a filter and search area 2106, a detail display area 2108 and a tabbed display area 2110. In one example of operation, an administrator selects watch group button 2104 to display a list of watch groups in watch group area 2102. The administrator may then select one watch group from the list of watch group area 2102 to display filter and search area 2106, detail display area 2108 and tabbed display area 2110. The administrator may select options within filter and search are 2106 to control display of information within detail display area 2108.

Figures 20, 21:
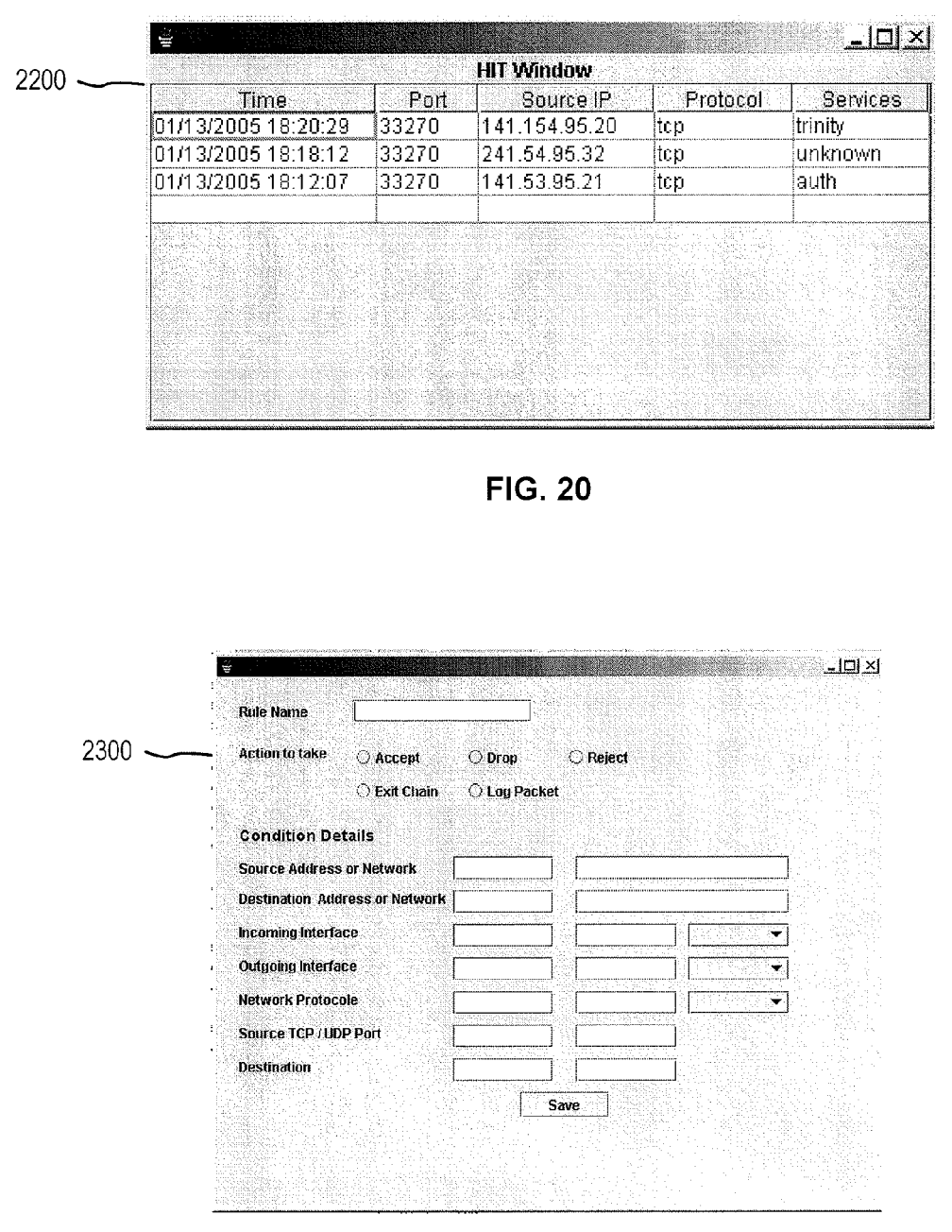

FIG. 20 shows one exemplary hit window 2200 illustrating usage of a port 33270. In this example, hit window 2200 shows the date and time that port 33270 was accessed by three different devices (indicated by the three different Source IP addresses) using the TCP protocol.

FIG. 21 shows one exemplary rule definition window 2300 illustrating fields that define each rule. Each rule has a unique name and may be configured, using rule definition window 2300, to cause one or more actions if certain conditions, specified by the rule, occur.

BML Format

To improve communication performance between agents, BML is selected as the communication protocol. A BML message (also known as a document) similar markup tags and data to an XML document. However, BML is more efficiently represent and transmitted, as compared to XML documents that are purely textual, since data is in a binary format. Further, BML is less human readable and therefore more secure. BML is specifically useful for automated data processing, for example.

To illustrate differences between BLM and XML, consider the following XML fragment:

```
<user-count>150</user-count>
    or:
<user-count value="150"/>
```

This requires at least 23 bytes, plus processing time to convert the binary representation of the numeric value to a textual representation, then often converting it back to binary representation when the document is read back in.

By contrast, the equivalent BML representation:

```
00 A1 02 00 00 00 96 00 A1 FF
``` requires up only 10 bytes, and the numeric value ("150") is represented in binary format and required no specific conversion. (Note: minor processing may be required to convert the value to a format used by a specific processor—i.e., big-endian or little-endian). Representation of data in its native binary format results in a substantial reduction in memory usage, disk space, bandwidth, and processor time.

Specifically, decoding a BML message is faster than decoding XML and requires less software to do so. Similar to XML, BML format uses patterns of tagged data, which allows a common core of BML parsing and document validation similar to that enjoyed by XML users. However, there are substantial adjustments made to allow straightforward representation of various different types of data in binary form. Whereas XML uses textual format as the common denominator to represent all types of data, BML attempts to use a simple, natural representation of data in common forms, such as network order for integers or IEEE forms for floating point data. This means that BML parsers will need to know what type of data is represented in order to interpret the bytes correctly.

BML Tags

A BML tag consists of a tag value and a tag type indicator. The simplest form of BML tag is:

vv vv tt

Where vv vv is the tag value (similar to the XML local name) and tt is the tag type (an enumerated type). The tag value in this example is a two-byte integer in network order. The tag-type is always one byte representing the type of the data being tagged according to the following enumeration:

| Tag type | Data type | Data format |
|---|---|---|
| 01 | Tag content | BML tagged data |
| 02 | Integer | 4-byte signed int, network order |
| 03 | Unsigned integer | 4-byte unsigned int, network order |
| 04 | Short | 2-byte signed short, network order |
| 05 | Unsigned short | 2-byte unsigned short, network order |
| 06 | Long | 8-byte signed long int, network order |
| 07 | Unsigned long | 8-byte unsigned long int, network order |
| 08 | Boolean | 1-byte, non-zero for true, zero for false |
| 09 | Byte | 1-byte unsigned char |
| 0A | Date | Gregorian broken down, see below |
| 0B | Date | Epoch time, unix style, see below |
| 0C | Float | IEEE single precision floating point (4-byte) |
| 0D | Double | IEEE double precision floating point (8-byte) |
| 0E | String | Length-prefixed UTF-8 encoded Unicode data |
| 0F | Octets | Length-prefixed sequence of bytes |
| 10 | OID | Similar to sequence of unsigned shorts, interpreted as an OID value. |
| 11 | NULL | Empty tag. |

-continued

| Tag type | Data type | Data format |
|---|---|---|
| 40 | Continue flag | Bitwise or with type 0D, 0E, or 80 to indicate continuation where length is too long for one tag |
| 80 | Sequence flag | Bitwise or with type 02-0B for length-prefixed array of primitive types |
| FF | End tag | Used to close a tag, for well-formedness. |

Generally, the length of data encoded in a BML document is either implicit in the tag type, or explicitly included as a prefix to the data. Length prefixes are 2-byte unsigned integers. Zero length sequences and arrays are allowed. For example, to encode the array of shorts {0, 1, 2, 3}:

```
0C B3 84 00 04 00 00 00 01 00 02 00 03 0C B3 FF
```

The tag value 0CB3 is used to tag the semantics of this array. (See the BML Schema document for information about matching tag values to semantics.) The tag type 84 tells the BML processor to expect a sequence of shorts. The next two bytes (0004) are the length prefix, telling the processor to expect four values. The next eight bytes are the four values of the array in sequence. Then there is the close tag marker 0CB3 FF.

As this example shows, the actual data provided for the tag is enclosed by the BML markup. First the tag value, then the tag type, then the appropriate data, then the same tag value and the FF tag type marking the closing tag. (Technically, the closing tag would not be required when the content is of a fixed or specified length. However, the closing tag is still required in BML. This allows the BML processor to verify the document is well-formed, to avoid errors or mistakes in document formatting or identification.

There are some redundancies here, primarily to account for semantic differences. For example, a sequence of unsigned shorts (tag type 85) is functionally identical to an OID (tag type 10). Also, a sequence of bytes (tag type 89) is functionally identical to an Octets (tag type 0F). In addition, in some cases where a sequence of primitives is expected, a single element of the appropriate type may be allowed (e.g., tag type 07 where tag type 87 is expected). BML parsers may, but are not required to, allow free substitution between functionally equivalent tag types. BML parsers operating in strict parsing mode should not allow such substitutions.

Date Types

In most programming, there are two common representations of dates. One is the date broken down into fields, as exemplified by the 'C' programming language "tm" structure for data and time. The other is time-since-epoch, as exemplified by the 'C' programming language type "time_t" or the 'C' programming language structure "timespec". BML allows either type to be used in markup, as specified below. There is no recommendation for which is preferred. BML processors must be able to process either one.

The format for broken-down time in BML is:

year month day hour min sec 00 nanosec utcoffset

The year is specified as 2-byte signed integer with negative values expressing years BCE and positive values expressing years CE. The month is specified as a single unsigned byte in the range 1-12, the day is a single byte in range 1-31, the hour is a single byte in range 0-23, the minute is a single byte in range 0-59, the second is a single byte in range 0-61 (allowing technically for leap seconds), and nanoseconds is four bytes in range 0-999,999,999. The UTC offset is the number of seconds to add to UTC to get the local time in which this format is expressed. (Equivalently, the number of seconds to subtract from this time to get the UTC time.) This quantity is expressed as a four-byte signed integer. Between the seconds and the nanoseconds there is one additional byte of padding, making the whole representation 16 bytes in length. (This is for purposes of alignment, allowing possibly for expansion.) Note that these definitions differ in both size and definition from the standard 'C' representation of date and time (i.e., struct tm) definitions.

The timespec format uses seconds and nanoseconds since the epoch date, midnight Jan. 1, 1970 UTC. This is similar to the data returned by the C function time( ), except with nanosecond precision and a greater date range. The actual format is:

seconds nanoseconds

Here the seconds field is an eight byte signed integer, with positive values representing time after the epoch date, and negative values representing time before that date. The nanoseconds field is a four byte unsigned integer. BML does not put any additional constraints on the date, but be aware that many systems use 32-bit representations of the seconds field and may not be able to handle all values. Also, many systems do not deal well with time representation at the nanosecond level. Thus, there could be conversion error or truncation when a BML value is converted to some of the common internal representations. For example, a Java java.util.Date object represents time in milliseconds since epoch, so nanosecond level representation is not possible.

BML does not have a specific representation for time durations. They should be encoded in BML using one of the integral types, with a semantic mapping that specifies the units.

BML Header

The BML header is a preface to a BML document that specifies the BML version, format, and schema(s) in use. (See the BML Schema below for information about schemas.)

The BML header format is:

magic-number version format schema-spec

The magic number is the four byte quantity 0xD812D834. This is designed to be an invalid encoding of character data in all common Unicode formats so it is extremely unlikely that a non-BML document will start with the correct magic number. The version and format are both single bytes. Currently acceptable versions and formats are defined below. The schema-spec defines one or more schemas that are in use in the document. The actual format of the schema-spec is defined below.

Currently the only known version of BML is version 1. Any other version will produce an error. There are four defined formats for BML version 1. The format specifies the expected structure of the BML tags, similar to using or not using namespaces in an XML document.

| Format | Tag structure |
|---|---|
| 1 | 2-byte tag value with implicit schema |
| 2 | 2-byte schema id with 2-byte tag value |
| 3 | 4-byte tag value with implicit schema |
| 4 | 2-byte schema id with 4-byte tag value |

Formats that do not supply schema id as part of the tag (version 1, formats 1 and 3) use an implicit schema. In this case, the schema-spec must define either zero or one schemas, with schema id equal to 0. If no schema is defined, then the schema is implicit through context (for example, the document reader must be expecting a specific schema based on the document source). If one schema is defined, then that is assumed to be the schema for all tags in the document.

Formats that supply schema id must define in the schema-spec a mapping between schema id and the schema OID. Schema id is always local to the document. It is only a way to avoid repeating the full schema OID, similar to the way XML uses a prefix to refer to a namespace URI. The schema OID functions similar to the namespace URI as a unique identifier for the schema. In these formats, the schema id may be zero or non-zero, though it is encouraged to use non-zero schema id to distinguish this from the implicit schema case.

The schema-spec has the following format:

schema-spec: schema-count (schema-id oid-value)*.

The schema-id and oid-value must be repeated exactly schema-count times. The oid-value is specified as a length-prefixed sequence of two-byte unsigned integers:

oid-value: oid-len (unsigned short)*.

Document Body

A BML document body consists of a single BML tag with its data, which is called the main tag or main element, similar to XML. Most often, this tag will be a content tag (type 01) containing other tags, but this is not a requirement. All non-content tags are called primitive tags, since they can only contain raw data similar to XML's CDATA sections.

In this sense, a BML document is very analogous to an XML document, except that the tags and the data are written in a compact binary form instead of textual form. An XML document can be converted to a BML document in a fairly straightforward manner:

Define a schema that maps the tags and attributes of the XML document to BML tag values.

Attributes associated with an XML tag will be expressed in BML as primitive tags. Thus, any XML tag that has attributes must be expressed as a content tag in BML.

XML tags that do not have attributes and have no content (empty tags) are translated in BML with the NULL tag type.

XML tags that do not have attributes but do have CDATA sections are translated in BML with the String tag type.

XML tags that have mixed content (CDATA and tag data) are translated in BML as content tags, the CDATA sections will be BML String tag type, and the tag content will be appropriate BML tag types.

BML Schema

A BML schema is an association of BML tag values (2- or 4-byte integers) with some kind of semantic description of the tag content. Since BML tag values are designed to be compact rather than descriptive, the schema is necessary to convert the BML data into meaningful structures or output.

This association of tag values to semantics is one-to-one, meaning that within a given schema, a single tag value always matches up to a single semantic description. Like in XML, it is possible for a particular tag to have different significance depending on the document context. For example, a <name> tag may have different significance within the <author> section of a document than it does in the <editor> section. However, the document reader must impose this distinction. The BML schema does not support it.

If a BML document contains a tag value whose type is specified in the document as something other than the type specified in the schema, it is an error.

BML schemas are uniquely named by OID.

In some BML formats, a single BML schema is specified and all tag values are implicitly interpreted according to that schema. In other formats, one or more schemas may be specified and assigned temporary abbreviations (the schema ID for that document). The BML tags in these formats include the schema ID and the tag value.

In some circumstances, the BML schema for a document need not be explicitly specified. This would be the case where the document reader can infer the appropriate schema from context, such as a default schema for the reader application or a schema that is associated with the identity of the document writer.

Here is a sample (partial) BML schema, expressed in XML format. (XML format is chosen here for human readability.) Note the XML format here is flattened (i.e., no use of XML attributes) to correspond more closely with the BML logical format.

```
<?xml version="1.0"?>
<bml-schema xmlns="http://bml.org/BML/Schema">
    <schema-oid>1.3.1.142.14237.6.1</schema-oid>
    <schema-name>BML Schema schema</schema-name>
    <schema-tags>
        <tag>
            <tag-value>1</tag-value>
            <semantic>bml-schema</semantic>
            <description>Top-level tag for BML document containing a BML schema</description>
            <type>content</type>
        </tag>
        <tag>
            <tag-value>2</tag-value>
            <semantic>schema-oid</semantic>
            <description>OID name for a BML schema</description>
            <type>oid</type>
        </tag>
        <tag>
            <tag-value>3</tag-value>
            <semantic>schema-name</semantic>
            <description>Descriptive name for a BML schema</description>
            <type>string</type>
        </tag>
    </schema-tags>
</bml-schema>
```

Schematically, then, that same document could be written in BML as follows. (Since BML is a binary language, this is only a schematic outline of the document, not a byte-by-byte specification. Line breaks and spacing here are for clarity and are not part of the actual BML document. Text data here is represented by text rather than UTF-8 encoding as it would be in an actual BML document:

```
D812D8340101
    010000070001000300010008E371D00060001
    0101
        020800070001000300010008E371D000600010001FF
        03020011BML Schema schema0002FF
        0401
            etc.
        04FF
    01FF
```

The first line is the BML header marking this as a BML document in version 1, format 1. The next line is the schema line, defining a single schema using ID=00 (default), with the OID encoded as a sequence of 7 sixteen-bit integers. The next line is the open tag (tag value 01, tag type 01), which in this schema maps to the semantic bml-schema. The content of that tag is provided in part, followed at the end by the close tag (tag value 01, tag type FF).

Note that the size of the BML document in bytes will actually be quite a bit smaller, at the expense of having the semantics of the tags injected by reference to the schema. XML allows tags to be descriptive. The BML tag 0101 takes only two bytes, but says nothing about the content (at least not without the schema in hand). The XML tag <bml-schema> takes 12 bytes, but a human reading it will immediately be able to identify the nature of the document.

Thus, BML and XML perform complementary roles. In XML a schema or DTD is only necessary if you want to use a validating parser or some automated document processing, but the semantics of the document can still be carried by a useful choice of the tag names. In BML the schema is more integral to interpreting the document, because the tag values are essentially meaningless in and of themselves. BML is more natural to computer processing of documents because even in XML, automated processing is difficult or impossible without the schema. XML is more natural for documents that are destined for human readability or purely textual processing.

Also, BML is more efficient at transmitting intrinsic data types such as numbers, dates, Boolean values, blobs, etc. XML requires that such data be converted to textual data somehow (e.g., date or numeric formatting, or Base64 encoding for binary data), then transmitted, then converted back to the intrinsic data type.

Note that a BML schema is a different beast entirely than an XML schema. BML schema is more like XML namespaces than XML schema. XML namespace allows the same XML tag (local name) to be identified as distinct tags in different namespaces. The XML schema (similar to a DTD) defines the content rules for an XML document, such as which tags may (or must) contain which attributes or other tags. Thus, the XML schema is a content-oriented set of constraints on the allowed document structures. XML schema validation proves that the document is well-formed and follows the appropriate content rules. A BML schema associates tag type and semantic with the tag value. It allows the same tag value to be reused in other schemas, with different tag type and semantic. BML schema validation doesn't prove that content rules are followed, but does prove that the tag is defined and the data contained matches the expected data type.

To see the difference, imagine that we have a legal document that is to be encoded first, in XML, and second, in BML.

With the XML version, a well-constructed XML schema can validate that the document is complete and well-formed (i.e., all required elements are are present, optional elements are in appropriate places, and there are no unexpected deviations). When the schema defines value types and restrictions, the parser can also validate that the element values and content are appropriate. Thus, we can be sure that a plaintiff, defendant, cause of action, date of filing, attorney names, etc. will be present.

By contrast, the BML parser can verify that all data types are correct, and all tags are understood. However, the BML schema says nothing about which tags can appear where in the document. We can know that a certain tag value represents the plaintiff, but we can't be sure that it is in the right place in the document, or whether the document is complete without it.

The BML schema definition is intended to make BML schema simpler and easier to learn than XML schema. However, a later extension for BML schema might define BML content rules similar to the way that XML schema does.

Why Use BML Schema?

You can use BML without a formal schema. In BML version 1, either format 1 or 3 allows implicit schema, which means that the schema is not specified in the document, but the document reader either provides one or knows how to interpret the tag values without one. This allows the interpretation of tag values to be done in code instead of via a BML schema, which may be more efficient in many cases.

However, there are some reasons why a BML schema can be useful:

With a BML schema, the parser can detect unexpected tag values and improper data types. The document reader is spared the task of handling errors like these.

With a BML schema, it is easier to create document reader software that creates user-friendly output.

You can use the BML schema semantics to connect the BML document elements with other content descriptions, such as an associated XML schema, database tables, object attributes, etc. Document readers can use these other resources to convert BML documents to alternative forms.

Error messages from a BML parser with schema can be more meaningful.

A BML schema serves as documentation of which tag values are reserved for which uses, making it easier to manage BML documents in a situation where new document elements may be added in the future.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for protecting an enterprise system having an enterprise policy, the enterprise system having (a) a first realm comprising a first device with a first agent installed thereupon and a second device having a second agent installed thereupon, and (b) a second realm comprising a third device with a third agent installed thereupon and a fourth device with a fourth agent installed thereupon, the method comprising:
   determining:
      within the first agent, a first profile of the first device,
      within the second agent a second profile of the second device,
      within the third agent a third profile of the third device, and
      within the fourth agent a fourth profile of the fourth device;
   issuing, from a first type 2 super peer of the first realm, first and second agent trust credentials to the first and second agents, respectively, when the first and second profiles conforms to the enterprise policy;
   issuing, from a second type 2 super peer of the second realm, third and fourth agent trust credentials to the third and fourth agents, respectively, when the third and fourth profiles conform to the enterprise policy;
   forming a first cooperative agent cell with the first and second agents based upon the first and second agent trust credentials; and
   forming a first cooperative agent cell with the third and fourth agents based upon the third and fourth agent trust credential,
   wherein the second type 2 super peer is different from the first type 2 super peer,
   wherein the second and third devices are the same device,
   wherein the second and third agents are the same agent that cooperates within both the first and second cooperative agent cells, and
   wherein the second and third agent trust credentials are different from each other.

2. The method of claim 1, wherein at least one of the first and second agent trust credentials is verified periodically.

3. The method of claim 1, wherein at least one of the first and second agent trust credentials is verified immediately when the device attempts to connect to the enterprise system.

4. The method of claim 1, further comprising obtaining biometric data from a user of the device by utilizing a biometric scanner and including the biometric data within the profile information.

5. The method of claim 4, wherein the biometric scanner is one of the group including a fingerprint scanner, an iris scanner and a voice recognition system.

6. The method of claim 4, further comprising periodically operating the biometric scanner to verify the user of the device has not changed.

7. The method of claim 1, wherein at least one of the first and second agent trust credentials comprisea Public Key Infrastructure (PKI) certificate and a certificate extension.

8. The method of claim 1, wherein at least one of the first and second agent trust credentials comprisea public key and a digital signature of one of the first and second type 2 super peers, respectively.

9. The method of claim 8, wherein the the digital signature is decoded using the public key.

10. The method of claim 1, wherein at least one of the first and second agent trust credentials comprise hard and soft credentials.

11. The method of claim 10, wherein the hard and soft credentials are utilized to determine a level of trust for the device, the level of trust determining the level of communication between the enterprise system and the device.

* * * * *